(12) United States Patent
Orban et al.

(10) Patent No.: US 10,876,834 B2
(45) Date of Patent: Dec. 29, 2020

(54) GUIDANCE SYSTEM FOR LAND RIG ASSEMBLY

(71) Applicant: Schlumberger Technology Corporation, Sugar Land, TX (US)

(72) Inventors: Jacques Orban, Houston, TX (US); Vishwanathan Parmeshwar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/977,568

(22) Filed: May 11, 2018

(65) Prior Publication Data
US 2019/0346262 A1   Nov. 14, 2019

(51) Int. Cl.
*G01C 3/02*     (2006.01)
*H01Q 21/29*    (2006.01)
*G01S 7/40*     (2006.01)
*G01S 13/06*    (2006.01)

(52) U.S. Cl.
CPC ............... *G01C 3/02* (2013.01); *G01S 7/4021* (2013.01); *G01S 13/06* (2013.01); *H01Q 21/293* (2013.01)

(58) Field of Classification Search
None
See application file for complete search history.

(56) References Cited

U.S. PATENT DOCUMENTS

| | | | |
|---|---|---|---|
| 5,780,826 A * | 7/1998 | Hareyama | B66C 19/007 180/167 |
| 6,892,812 B2 | 5/2005 | Niedermayr et al. | |
| 6,896,055 B2 | 5/2005 | Koithan | |
| 6,931,621 B2 | 8/2005 | Green et al. | |
| 7,172,037 B2 | 2/2007 | Dashevskiy et al. | |
| 7,264,050 B2 | 9/2007 | Koithan et al. | |
| 7,357,196 B2 | 4/2008 | Goldman et al. | |
| 7,860,593 B2 | 12/2010 | Boone | |
| 7,938,197 B2 | 5/2011 | Boone et al. | |
| 8,121,971 B2 | 2/2012 | Edwards et al. | |
| 8,215,417 B2 | 7/2012 | Annaiyappa et al. | |
| 8,250,816 B2 | 8/2012 | Donnally et al. | |
| 8,386,059 B2 | 2/2013 | Boone | |
| 8,590,635 B2 | 11/2013 | Koederitz | |
| 8,718,802 B2 | 5/2014 | Boone | |
| 9,027,671 B2 | 5/2015 | Koederitz | |
| 9,223,594 B2 | 12/2015 | Brown et al. | |
| 9,285,794 B2 | 3/2016 | Wang et al. | |
| 9,410,417 B2 | 8/2016 | Reckmann et al. | |

(Continued)

FOREIGN PATENT DOCUMENTS

WO   2017204655 A1   11/2017
WO   2018186745 A1   10/2018

*Primary Examiner* — Jas A Sanghera
(74) *Attorney, Agent, or Firm* — Rachel E. Greene

(57) ABSTRACT

Systems and methods for determining a position of an object relative to another object are disclosed. One or more inductive rangefinders are used to determine a distance between an object, such as a stackable container for a drilling operation, and a second such container. A crane or other moving device is capable of stacking the containers on top of one another without the need for human operators being nearby. A processing unit makes calculations to identify the distance between the objects and a direction in which the object should move to arrive at the desired location.

25 Claims, 19 Drawing Sheets

(56) References Cited

U.S. PATENT DOCUMENTS

| | | | |
|---|---|---|---|
| 9,429,009 B2 | 8/2016 | Paulk et al. | |
| 9,436,173 B2 | 9/2016 | Wang et al. | |
| 9,506,336 B2 | 11/2016 | Orbell | |
| 9,528,364 B2 | 12/2016 | Samuel et al. | |
| 9,593,567 B2 | 3/2017 | Pink et al. | |
| 9,598,947 B2 | 3/2017 | Wang et al. | |
| 9,784,089 B2 | 10/2017 | Boone et al. | |
| 9,828,845 B2 | 11/2017 | Kpetehoto et al. | |
| 9,896,925 B2 | 2/2018 | Hernandez et al. | |
| 9,933,919 B2 | 4/2018 | Raja et al. | |
| 9,934,338 B2 | 4/2018 | Germain et al. | |
| 9,938,816 B2 | 4/2018 | Astrid et al. | |
| 9,946,445 B2 | 4/2018 | Whalley | |
| 9,959,022 B2 | 5/2018 | Anghelescu et al. | |
| 9,988,880 B2 | 6/2018 | Dykstra | |
| 9,995,129 B2 | 6/2018 | Dykstra et al. | |
| 10,113,408 B2 | 10/2018 | Pobedinski et al. | |
| 10,138,722 B2 | 11/2018 | Magnuson | |
| 2011/0102266 A1* | 5/2011 | Folden | G01S 13/08 342/458 |
| 2012/0242352 A1* | 9/2012 | Gong | H03K 17/9525 324/656 |
| 2014/0218036 A1* | 8/2014 | Fry | G01V 3/104 324/329 |
| 2015/0369030 A1 | 12/2015 | Hay et al. | |
| 2016/0024906 A1 | 1/2016 | Jamison et al. | |
| 2017/0308802 A1 | 10/2017 | Ramsoy et al. | |
| 2018/0156023 A1 | 6/2018 | Dykstra et al. | |
| 2018/0298693 A1 | 10/2018 | Van Duivendijk et al. | |
| 2018/0298694 A1 | 10/2018 | Van Duivendijk et al. | |
| 2018/0328159 A1 | 11/2018 | Mandava et al. | |
| 2018/0334887 A1 | 11/2018 | Dashevskiy et al. | |
| 2019/0064115 A1* | 2/2019 | Timmons | G01N 27/83 |

\* cited by examiner

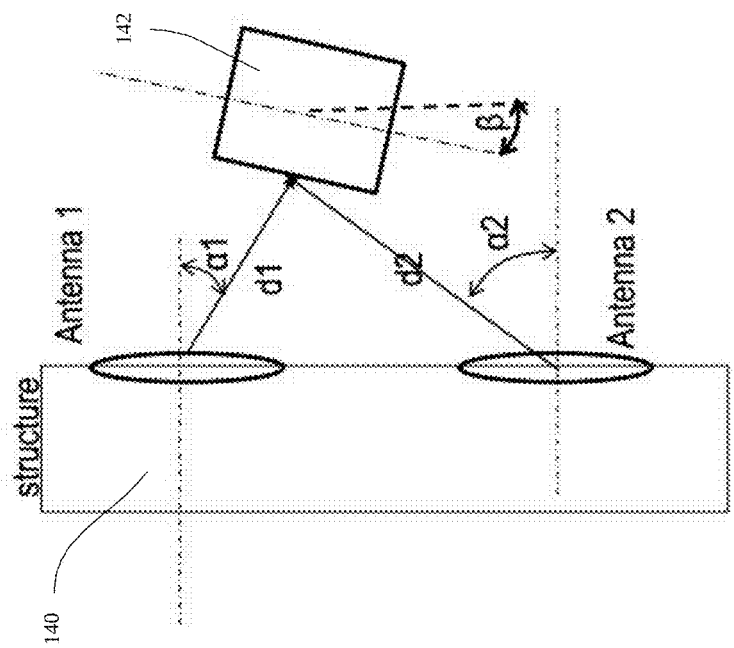
Fig. 8
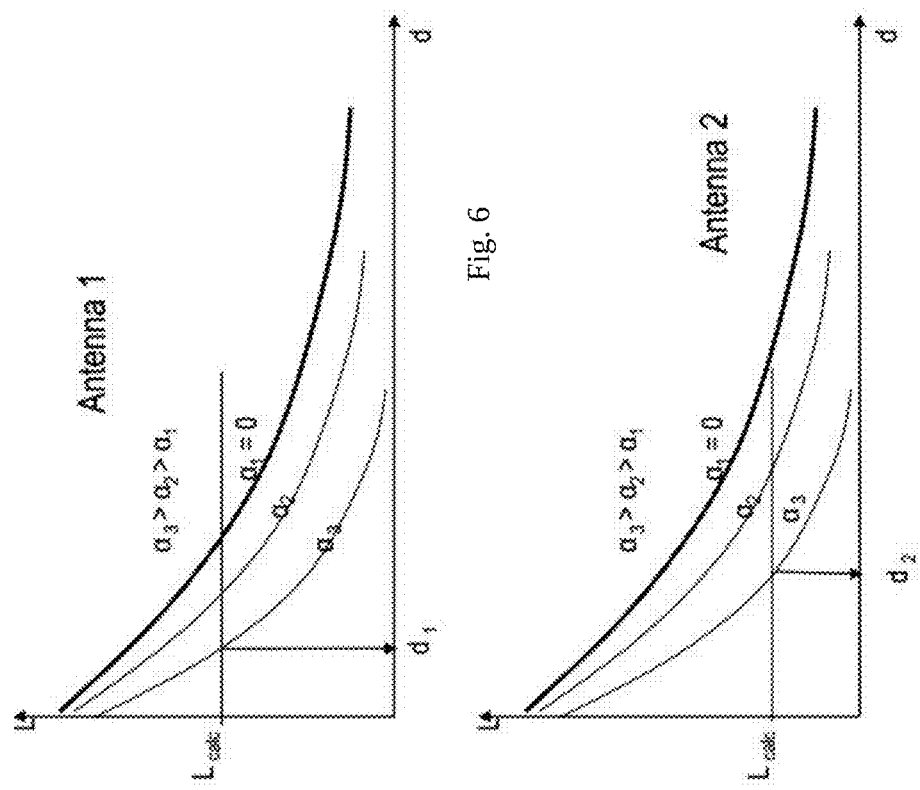
Fig. 6
Fig. 7

GUIDANCE SYSTEM FOR LAND RIG ASSEMBLY

BACKGROUND

Drilling rig operations are frequently assembled at a wellsite location from several transport loads which can be of different shapes, such as containers and other structures which are delivered to the wellsite by truck or rail. Assembling the rig includes using a crane to lift and stack certain components in a predetermined order. The transport loads and containers can contain heavy and possibly sensitive equipment which will be coupled together once the containers and other components are properly stacked and arranged. Many rig assembly operations are carried out using ropes tied to the transport loads and operators standing in a potentially dangerous position while the crane operator attempts to place the load in a position which may be outside of his vision. There is a need for an improved technique which addresses these problems and achieves a safer, more efficient stacking operation.

SUMMARY

Embodiments of the present disclosure are directed to a system for placing a series of objects. The system can include a data storage component configured to store electromagnetic properties pertaining to a series of objects and to store a list of the objects in a predefined order. The objects are to be positioned relative to one another serially. Most objects have a lower flat surface of reference which normally is positioned horizontally. The lower flat surface may be defined as the lower edge of the beams defining the chassis of the object. The system includes a moving device configured to move a first object in the series relative to a second object in the series, and a plurality of rangefinders coupled to the first object and being configured to measure distance to the second object. Individual rangefinders may include an AC current source, an antenna configured to receive AC current from the AC current source to generate a magnetic field around the antenna, a measurement component configured to measure the magnetic field and disruptions in the magnetic field caused by the second object, and a processing unit. The processing unit can communicate with one or more of the rangefinders and access the electromagnetic properties of the second metallic object from the data storage component. The disruptions in the magnetic field caused by the second metallic object are a function of the electromagnetic properties of the second object. The processing unit can also receive two or more variables pertaining to position of the first object relative to the second object. A number of variables is equal to a number of rangefinders. Individual rangefinders provide separate distance readings. The processing unit can also calculate a value for the variables.

In further embodiments the system includes a plurality of rangefinders that are packaged in a self-contained unit that is configured to be attached to the first object. In one embodiment, the self-contained unit are removably hooked onto the first object. In further embodiments there are six rangefinders and six variables, pertaining to an x position, an x angle, a y position, a y angle, a z position, and a z angle. In one embodiment, the first and second objects are considered to be horizontal; there is only one angle as variable. This angle is the rotation versus a reference around a vertical axis. In such case, only 4 variables defined the location of the objects (the 3d position of the center of gravity and its rotation around a vertical axis).

Further embodiments of the present disclosure are directed to a method including compiling a list of objects to be placed relative to one another serially, acquiring electromagnetic properties of the objects, and for each consecutive pair of objects, first and second, the method includes positioning rangefinders on the first object and propagating a magnetic field from the rangefinders. The magnetic field is disrupted by the second object in a manner that is known from the electromagnetic properties. In one embodiment, the method also includes determining a distance between the first and second object from the magnetic field disruption. In a generalized embodiment, the method defines a set of locating surfaces where the center of gravity of the object could be located while insuring the proper disruption of the magnetic field in the antenna. The orientation of the second object versus the first object corresponds to a parameters to select the proper surface in the set of surfaces. A predetermined number of variables pertaining to the physical position of the first object are calculated from the predetermined number of rangefinders. The predetermined number of variables is the same as the predetermined number of rangefinders. The method also includes identifying a direction of movement that will bring the first object nearer to a desired position relative to the second object, and moving the first object in the direction of movement.

In still further embodiments the present disclosure is directed to a packaged rangefinder unit having a battery, a plurality of antennas, and an analog electric circuit configured to emit an electromagnetic signal from the antennas using the battery. Each antenna is configured to take a reading of a disturbance in the electromagnetic signal caused by the induction target, allowing to define the set of locating surface. It should be noted that when having N sets of locating surface obtained by the N measurements, only one combination of the object coordinate and positions angle(s) allows the proper positioning over the whole sets of positioning surface. To resolve this issue, iteration over the N parameters defining the location of the object allows to solve the problem. The packaged rangefinder unit also includes a digital unit configured to calculate a distance from electromagnetic properties of the induction target and the reading of the disturbance and a communications unit configured to communicate the distance to a remote unit. The packaged rangefinder unit is removably couplable to an object such as by a hook.

BRIEF DESCRIPTION OF THE FIGURES

FIGS. 6 and 7 are graphs showing relationship between inductance and distance for Antenna 1 and Antenna 2, respectively, according to embodiments of the present disclosure.

FIG. 8 is a schematic representation of the relationship of the two antennas and a measured object (such as a lifted load) according to embodiments of the present disclosure.

DETAILED DESCRIPTION

Figure 1:
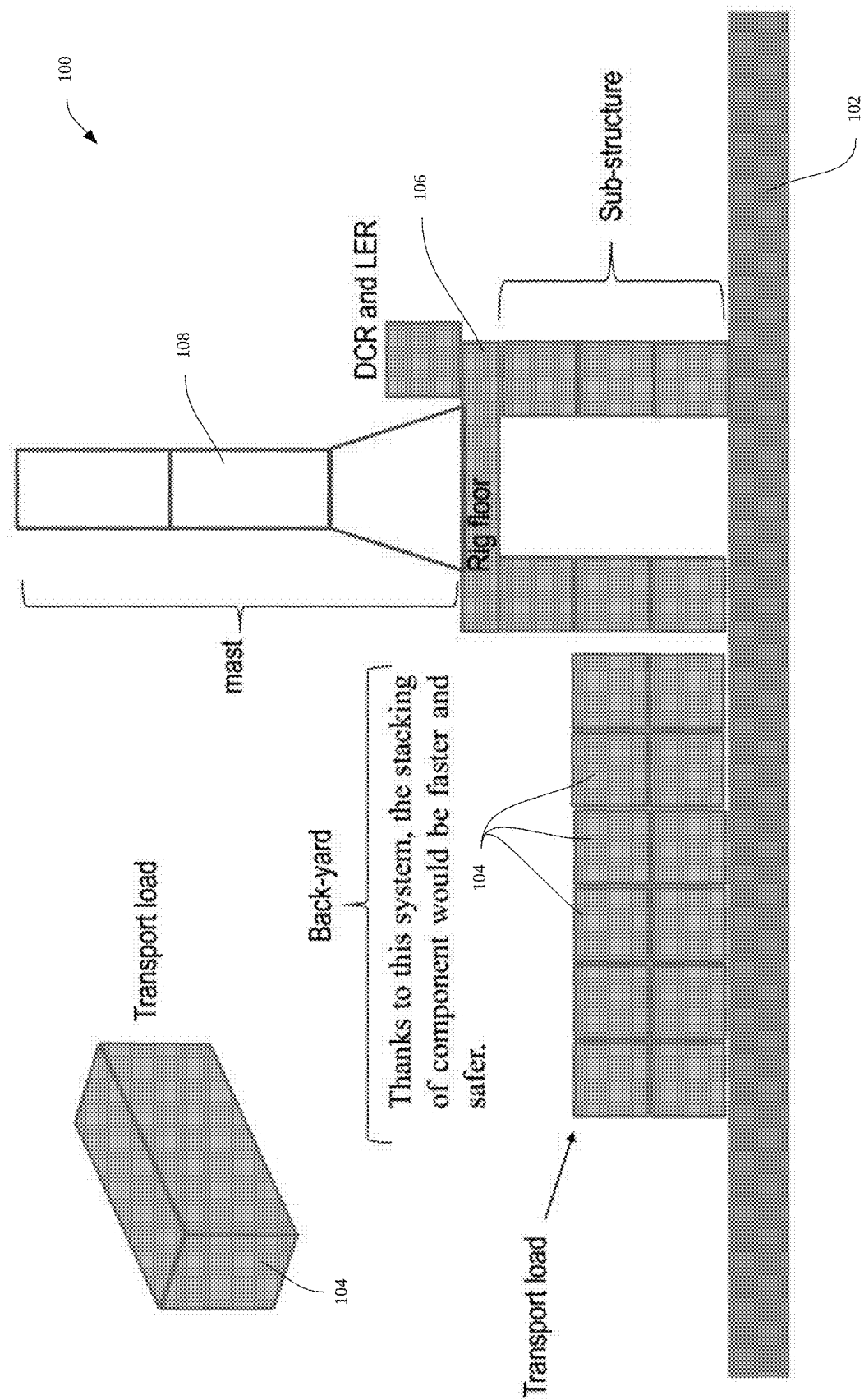
FIG. 1 is a schematic illustration of a rig assembly operation according to embodiments of the present disclosure.

Below is a detailed description according to various embodiments of the present disclosure. Throughout this disclosure, relative terms such as above or below generally refer to an orientation relative to a fixed external surface but are not to be construed in a limiting manner. FIG. 1 is a schematic illustration of a land drilling rig assembly operation 100 according to embodiments of the present disclosure. The rig can be assembled onto a surface 102 which can be the earth's surface or a series of rails or another suitable supporting surface. The rig can be assembled from a plurality of "boxes" 104 which can be containers or any other structure from which the rig is constructed. The boxes 104 can be uniform or different. The boxes 104 can contain different materials such as electronics, motors, cabling, machines, tanks etc. The boxes 104 can have virtually any shape and can be constructed of virtually any material. However, carbon or alloy steels are the most common materials. Frequently in the oilfield containers such as the boxes 104 are approximately three meters high, three meters wide, and twelve meters long. Such containers are somewhat standard and are suited to be delivered via truck to a wellsite. Commonly these boxes have a flat lower reference surface. However, it is to be appreciated that the systems and methods of the present disclosure can be used with boxes 104 of virtually any shape, size, material, and contents.

In some embodiments the boxes 104 can be ordered and a predetermined plan for construction can be known. The boxes 104 can be serially numbered and the contents and structure of each box 104 can be known ahead of time. In some embodiments the system can include scanning equipment configured to identify the characteristics of the boxes at the wellsite.

The boxes 104 can be structured into virtually any suitable shape. In some embodiments the boxes 104 can form a support for a rig floor 106 which itself can support a mast 108. Other structures can be constructed as desired in a given installation.

Figure 2:
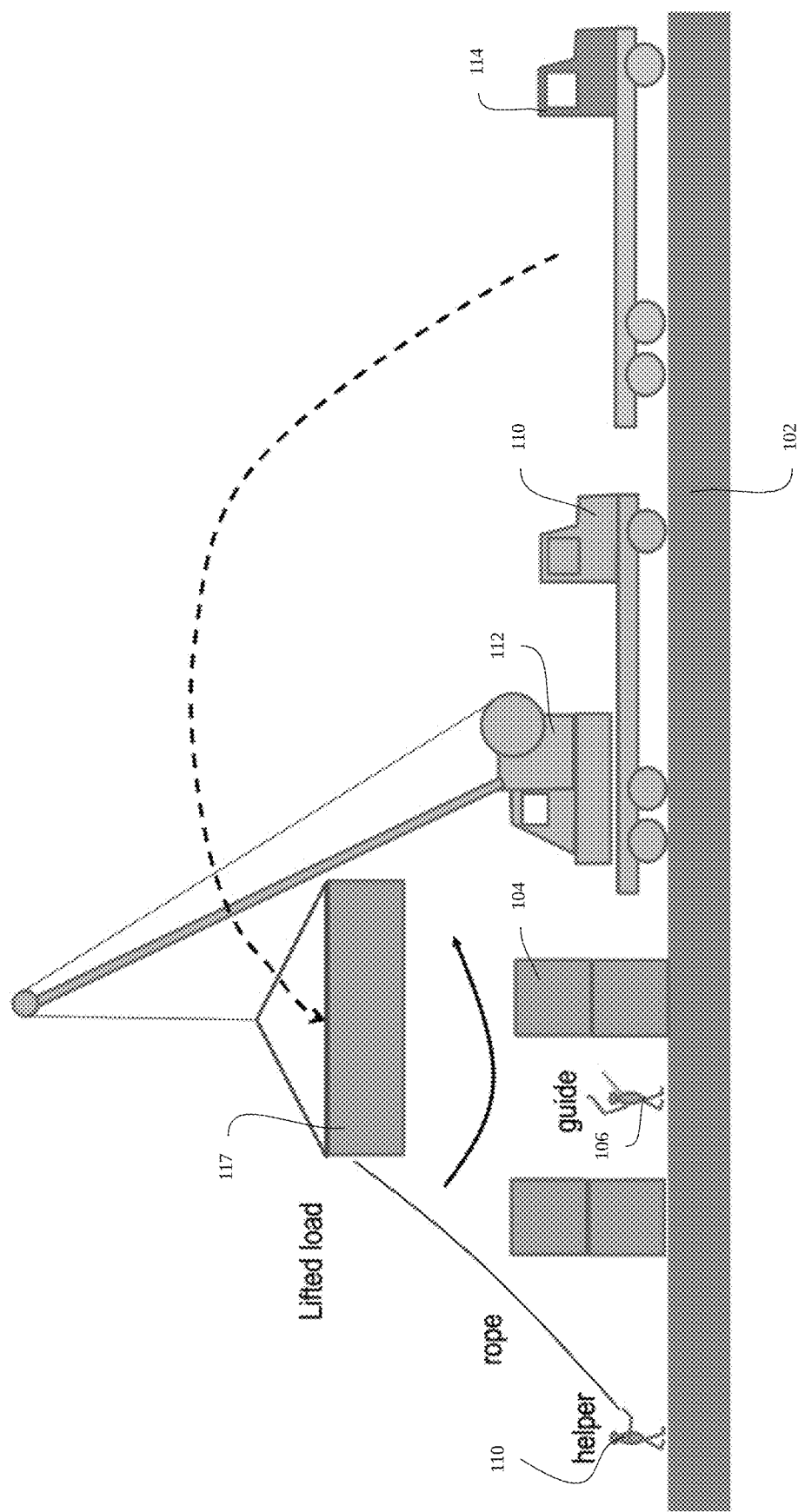
FIG. 2 is a schematic illustration of a stacking operation according to embodiments of the present disclosure.

FIG. 2 is a schematic illustration of a stacking operation according to embodiments of the present disclosure. In some embodiments a plurality of boxes 104 can be transported to the wellsite by a truck 114 or other suitable conveyance. Another truck 110 can include a crane 112. Of course a crane 112 may be independent of a truck. The crane 112 is configured to lift boxes 104 and stack them according to a predetermined order for a rig assembly. Frequently operators 106 are used to direct the lifted box 117 onto other boxes. There are times where the structure obstructs vision of the crane operator, creating a potentially dangerous and inefficient situation. There is a need in the art for a more reliable, efficient, and safer system and method of assembly.

Figure 3:
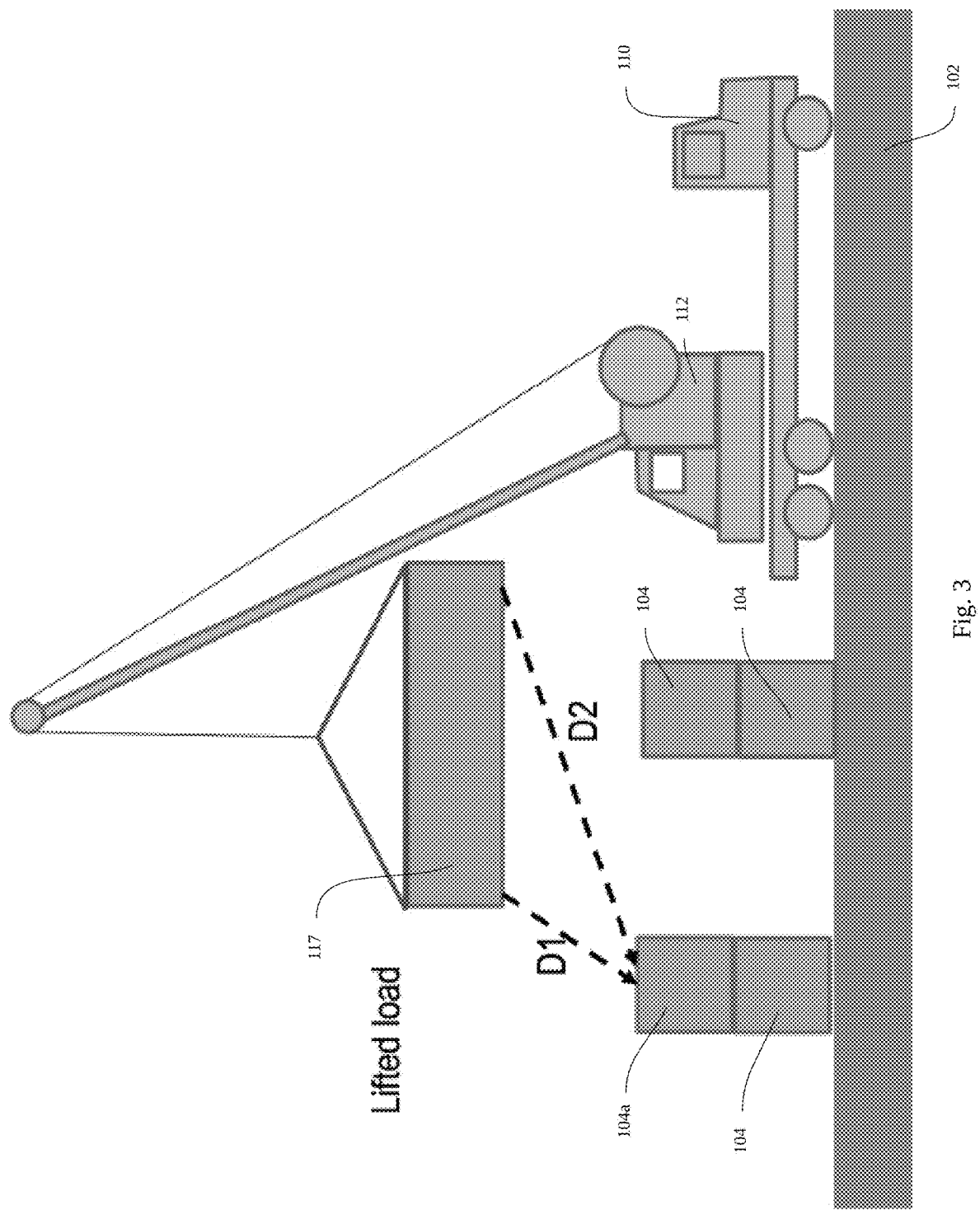
FIG. 3 is an illustration of systems and methods for assembling a drill rig according to embodiments of the present disclosure.

FIG. 3 is an illustration of systems and methods for assembling a drill rig according to embodiments of the present disclosure. A truck 110 equipped with a crane 112 hoists a lifted load 117 to stack the lifted load 117 onto a stacked container 104. There can be any number of stacked containers 104 in any configuration. In many embodiments the stacked container 104 have a predetermined pattern and order in which they are to be stacked. In this embodiment the lifted load 117 is to be placed onto stacked load 104a. In some embodiments one or more distances between the lifted load 117 and the stacked container 104a can be determined. The distances can be determined using any one or combination of inductance, radar, optics, surveying equipment, magnetism, or laser.

Figure 4:
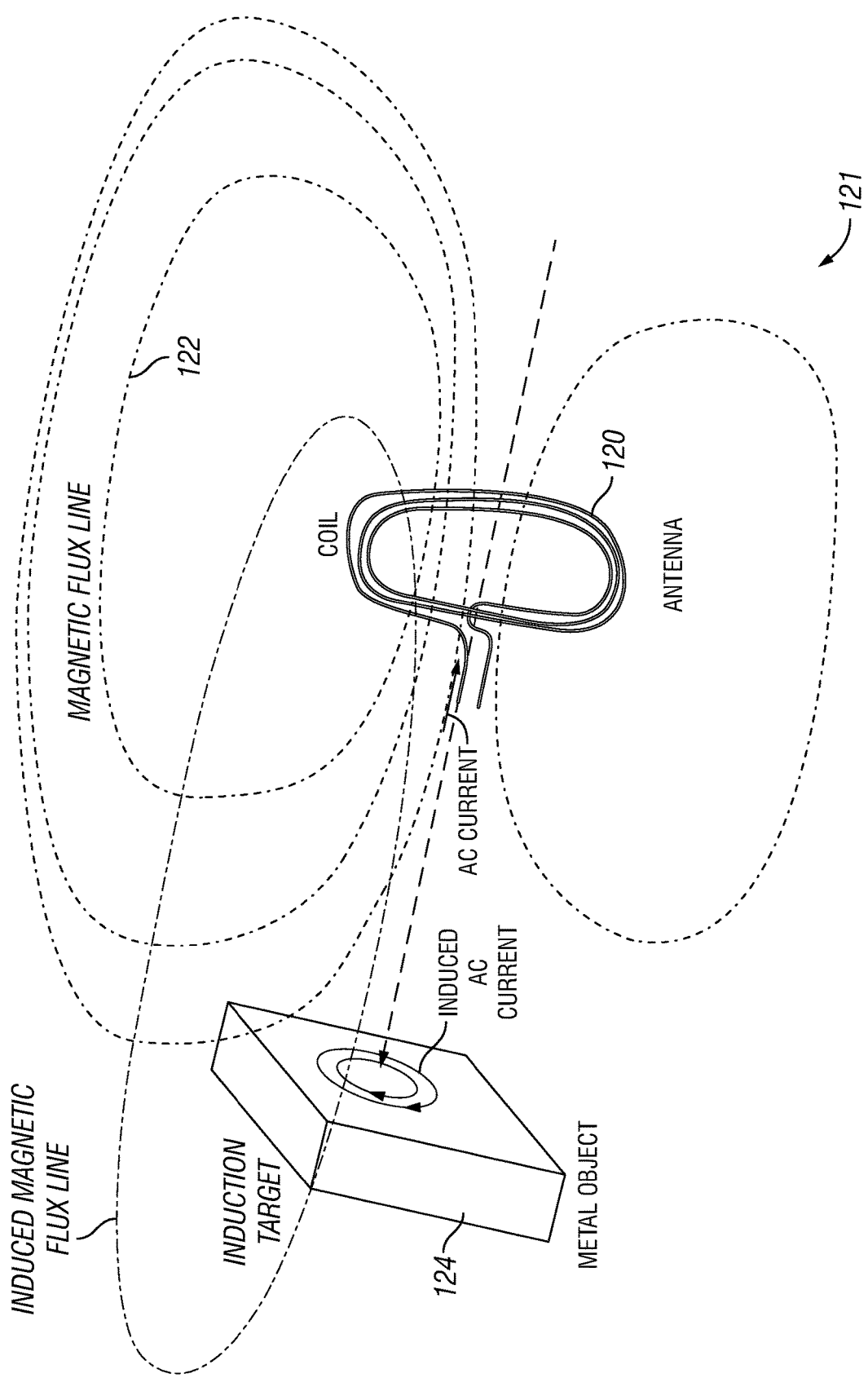
FIG. 4 is an illustration of a rangefinder that uses an induction effect to determine distance between two objects according to embodiments of the present disclosure.

FIG. 4 is an illustration of a rangefinder 121 that uses an induction effect to determine distance between two objects according to embodiments of the present disclosure. An antenna 120 is formed of a coil through which an AC current is driven at a predetermined frequency and voltage. (Suppose the coils are perpendicular to the viewer.) The AC current causes an axisymmetric AC magnetic field 122 around the antenna 120. An induction target 124, when brought near to the antenna 120, will cause a disturbance in the AC magnetic field 122, and an induced AC current in the induction target 124. The characteristics of the disturbance can be measured. In combination with the physical properties of the induction target 124, the disturbance of the magnetic field can be used to calculate a distance between the antenna 120 and the induction target 124.

Figure 5A:
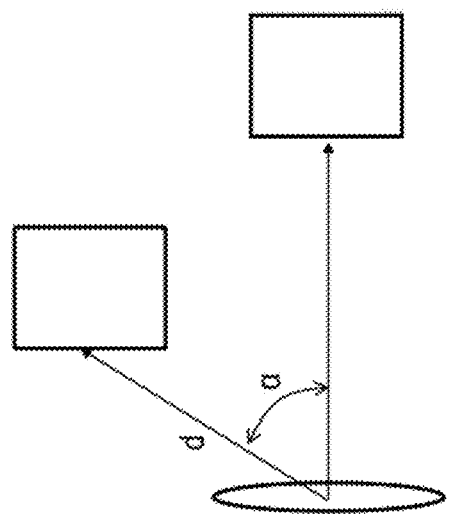
FIG. 5*a* is a schematic depiction of d (distance) and a (angle) according to embodiments of the present disclosure.
Figure 5:
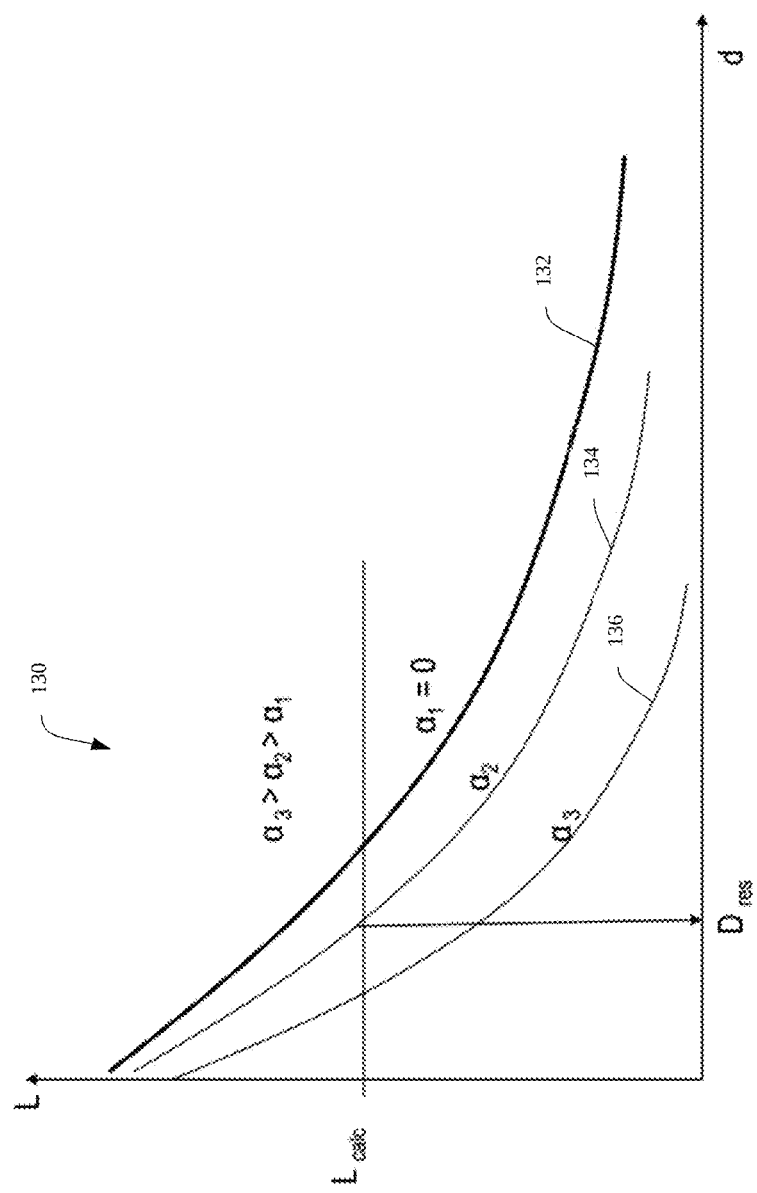
FIG. 5 is a graph of inductance versus distance according to embodiments of the present disclosure.

In one embodiment, the disturbance generated by the induction target may be determined as a change in inductance of the coil. In practical terms, the drive AC current and the corresponding voltage may be determined at the 2 terminals of the antenna, allowing to determine the antenna impedance as the ration of the voltage over the current. This impedance is a combination either of amplitude and phase, or real and imaginary part. From the impedance imaginary part, the antenna inductance can be determined FIG. 5 is a graph 130 of antenna inductance versus distance according to embodiments of the present disclosure. FIG. 5a is a schematic depiction of d (distance) and a (angle) according to embodiments of the present disclosure; the antenna is perpendicular to the surface of the drawing with its axis being shown. The induction target moves versus d and a while staying parallel to itself. There are three curves 132, 134, and 136, each for increasing values of a. The relationship between a and d can accordingly be determined. Using two or more antennas and/or two or more induction targets, two variables can be determined. The two variables can be in terms of a distance and an angle as shown in FIGS. 5 and 5 a, or they can be in terms of an x and y position. More variables can be achieved by using more antennas/induction targets. In some embodiments the number of variables is equal to the number of antennas or induction targets in the system so that the system is deterministic and the values for the desired variables can be calculated readily. The particulars of the determination method or calculation of the variables is known in the art and therefore these details are given little discussion here to preserve clarity and not to obscure features of the present disclosure.

FIGS. 6 and 7 are graphs showing relationship between inductance and distance for Antenna 1 and Antenna 2, respectively, according to embodiments of the present disclosure. FIG. 8 is a schematic representation of the relationship of the two antennas and a measured object 142 (such as a lifted load) according to embodiments of the present disclosure. In some embodiments a structure 140 is equipped with two antennas: Antenna 1 and Antenna 2. The two antennas can be spaced apart sufficiently to allow for sufficient resolution between measurements. The precision of the determined distance depends on the properties of the antennas and the sensitivity of the electronic (not shown) associated with the antenna, as well as the resolution of the ADC to convert the analog measurement into a digital information, allowing the computing device to perform the calculation. The structure 140 can be the stacked container 104a from FIGS. 2 and 3, and the measured object 142 can be the lifted load 117 also from FIGS. 2 and 3. In some embodiments the antennas can be placed on the measured object 142 and the system works inverted. It is to be appreciated that such a position swap makes very little difference in how the systems and methods of the present disclosure will operate. Using the two antennas, the distance and angle of the measured object 142 relative to the antennas can be calculated. Accordingly, the movements of the crane (112 in FIGS. 2 and 3) can be dictated according to the distances and angles calculated. A control system which can be executed by a PLC or other suitable equipment can move the crane in such a way to minimize the distances and/or achieve desired angles. Virtually any positioning or distance optimization is possible once the distances and angles are known with sufficient resolution. The number of variables needed for a particular movement or building operation can determine the number of antennas (or induction targets) needed. Shown in FIG. 8 is an angle β which is measured against a horizontal plane, FIG. 8 being a top-view. This angle can also be achieved by adding sufficient antennas and/or induction targets on the measured object 142. At least 3 independent measurement would be required to determine the position of the center of the lifted load 142 and its rotation angle β around the vertical axis of that lifted load, supposing that the lifted load stays horizontal during the operation.

Figure 9A:
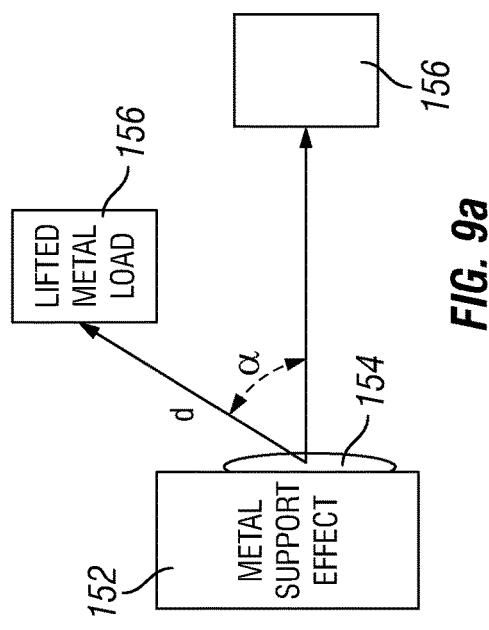
FIG. 9a illustrates the physical relationship between the metal support, an antenna, and a lifted metal load (shown in two positions) according to embodiments of the present disclosure.
Figure 9:
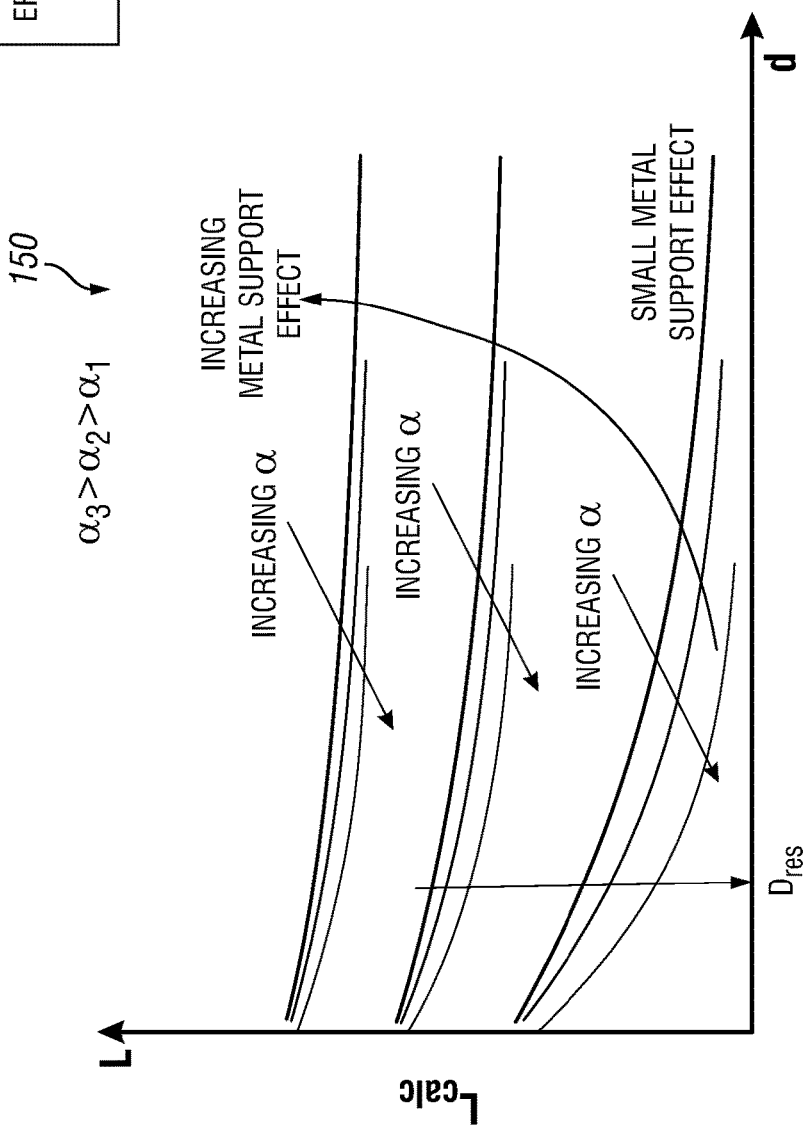
FIG. 9 is a graph of inductance against distance showing the effect caused by the structure itself being metal and therefore having inductive properties according to embodiments of the present disclosure.

FIG. 9 is a graph 150 of inductance against distance showing the effect caused by the structure itself being metal and therefore having inductive properties according to embodiments of the present disclosure. FIG. 9a illustrates the physical relationship between the metal support 152, an antenna 154, and a lifted metal load 156 (shown in two positions) according to embodiments of the present disclosure. The antenna 154 can be mounted to the support 152 which itself may have metal components or other components that affect the inductance of the antenna and therefore may interfere with the distance reading. As shown in the graph, as a increases the inductance of the effect of the metal support 152 is less. Calculations made to achieve the distance can take this affect into account by knowing ahead of time the physical properties of the metal support 152 and filtering them out.

The measurements can include phase and amplitude versus the drive signal, then the impedance may be determined:

$$Z = \frac{V}{I}$$

Z may be calculated as a complex number to include the effect of the phase:

$$Z = R + j\omega L$$

Knowing the resistance R of the coil, we can determine the inductance $L_{calc}$ from the values of I, V, R, and F (the frequency of the current). Knowing $L_{calc}$ the potential distance can be determined, if a second piece of information is obtained. The angle α could be the second measurement, which allows calculation of the distance, $D_{res}$. As a practical application, when there are four unknowns there can be four antenna taking four measurements so the equations can be solved. This can be achieved using an error function:

$$\text{error} = \frac{1}{4}\sqrt{\frac{(\text{lref1} - \text{Lmea1})^2 + (\text{lref2} - \text{Lmea1})^2 +}{(\text{lref3} - \text{Lmea3})^2 + (\text{lref4} - \text{Lmea4})^2}}$$

The above equation is for four variables, where error is the error for parametric value of a guessed position, lrefn is the value of inductance determined at sensor n from the reference data for that position, and Lmean is the corresponding measured value. Other equivalent mathematical methods for calculating the distance are also possible within the scope of the present disclosure. In some embodiments each antenna could have a diameter of approximately 25-75 cm and they could be driven at 5-100 KHz. With the proposed inductance estimation, it may be possible to track the large lifted load over a distance up to 20 meters with an accuracy of 10% to 20% of the measured distance.

Figure 10:
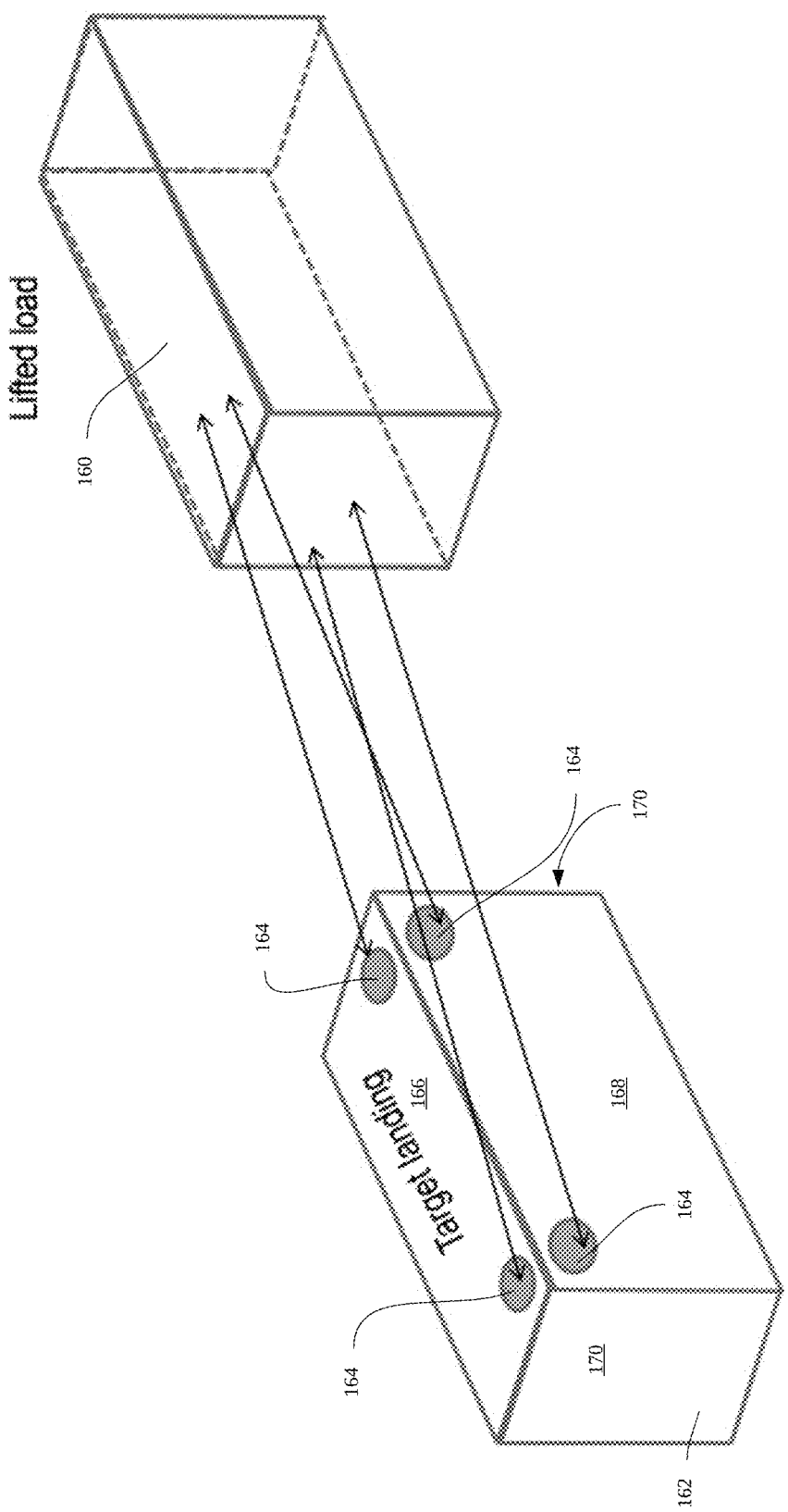
FIG. 10 illustrates how a lifted load and a target landing are stacked together according to embodiments of the present disclosure.

FIG. 10 illustrates how a lifted load 160 and a target landing 162 are stacked together according to embodiments of the present disclosure. The target landing 162 can have a plurality of antennas 164 mounted to various surfaces that are used to determine a distance between the target landing 162 and the lifted load 160. As a crane or other moving device moves the lifted load 160 toward the target landing 162 the distance is measured. The position of the lifted load 160 relative to the target landing 162 is therefore known and the two parts can be stacked with the lifted load 160 on top of or next to the target landing 162. In some embodiments the antennas 164 are placed strategically as shown: two on a top surface 166 and two on a front surface 168. The antennas 164 can be spaced apart as far as necessary to provide sufficient resolution. In some embodiments the antennas 164 are near the ends 170 of the target landing 162.

Figure 11:
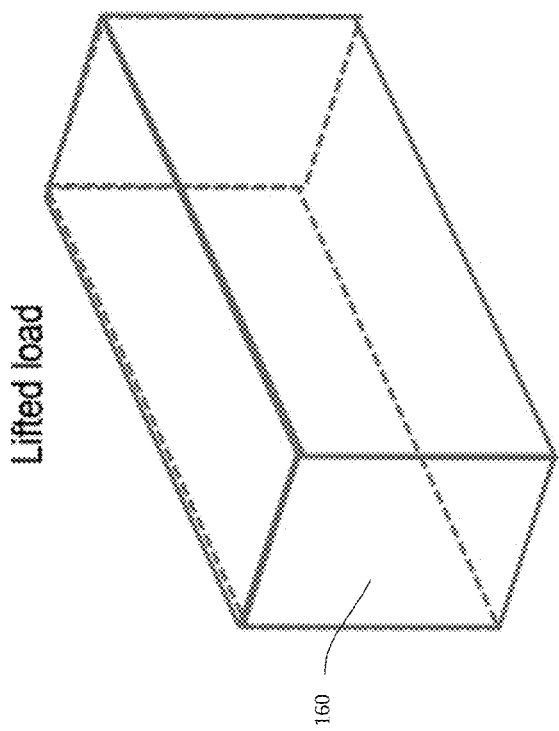
FIG. 11 shows another embodiment in which there are additional antennas on a target landing.
Figure 11:
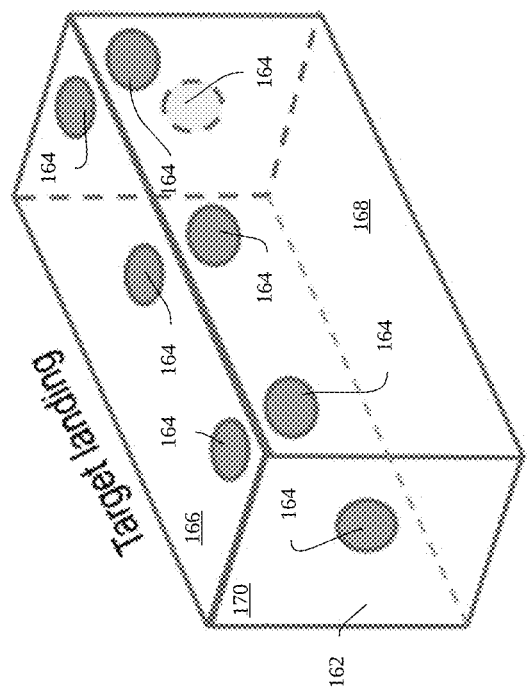

FIG. 11 shows another embodiment in which there are additional antennas 164 on a target landing 160. Specifically, there are three sensors on the top surface 166, three on a front surface 168, and one on each end 170. The antennas 164 at the ends 170 can be used to identify the limits of the target landing 160 in that direction, the antennas 164 on the front 168 can be used to determine distance toward the target landing 160, and the antennas 164 on the top 166 can be used to determine how high above the target landing 160 is the lifted load 162.

Figure 12:
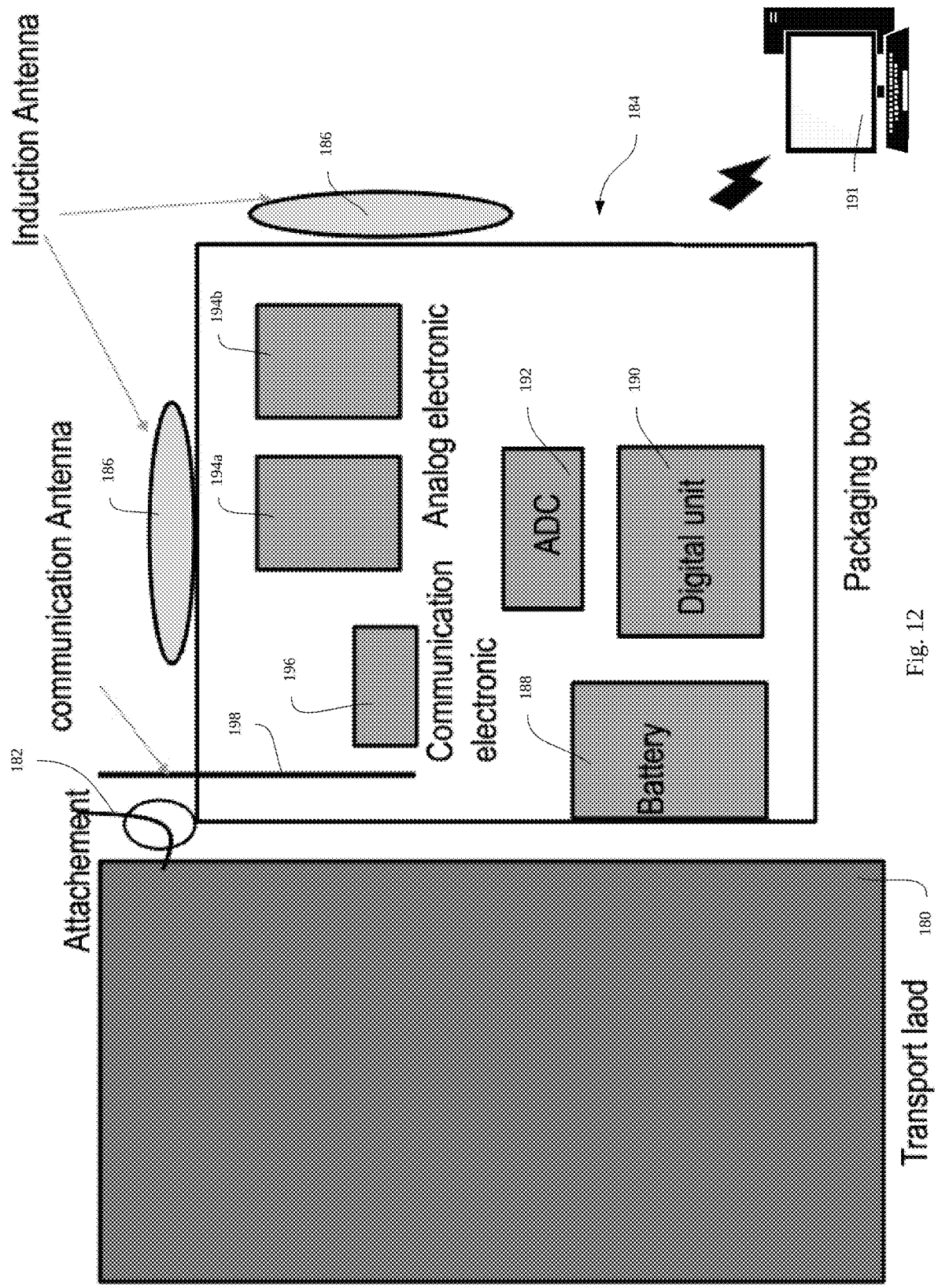
FIG. 12 shows embodiments of the present disclosure in which antennas are packaged together.

FIG. 12 shows embodiments of the present disclosure in which antennas are packaged together. A transport load 180 can be a container as discussed previously which can carry components and equipment for a drilling rig. Any number of such loads can be stacked together to build the rig. The transport loads 180 are arranged in a serial fashion with a predetermined order, and knowing the physical properties of each such that an inductance profile for each such load is known. The transport load 180 can include an attachment 182 such as a hook, or a bolt pattern, or a magnet, or any other suitable attachment means. A package 184 can be attached to the attachment 182 while a lifted load (not pictured) is lifted and placed relative to the transport load 180. Once the lifted load is in place, the package 184 can be removed from the transport load 180 and placed onto the newly placed load for use with the next container or object to be placed. Sequentially, any number of containers or objects can be stacked and arranged with precision by reusing the package 182.

According to embodiments of the disclosure the package 184 can contain any components necessary to function as an antenna as described elsewhere herein to provide range-finding capabilities. The package 184 can include any number of antennas 186. The antennas 186 can be on two or more sides of the package 184. For example, in some embodiments the package 184 can have antennas 186 on a front side, a top side, and an end of the package 184, and the package 184 can be placed onto a container to provide the top-front-side antenna position shown in FIGS. 10 and 11. In some embodiments there are two packages, left and right, to achieve the six antennas configuration shown in FIG. 10, which provides six unknown quantities which is sufficient to identify the position of the lifted load within a high degree of certainty (x, y, z position and x, y, and z angles).

The package 184 can also include a battery 188, a digital unit 190, an ADC 192, and analog electronics 194a and 194b to correspond to the antennas 186 (can be as many analog electronics as antennas). The package 184 can also include an electronic communication module 196 and an antenna 198 to communicate with a controller or other computing mechanism. The module 186 and/or communication antenna 198 can be a WIFI or Bluetooth communications device or another suitable mechanism for communicating with a central computation component or other PLC or calculator.

The package 184 can also be configured to interact with the transport load 180 to identify which load it is in the series of loads. In some embodiments, the package 184 is configured to receive identification information for the transport load 180, such as "box 13 of 20" for example. RFID tag could be installed on the transport load 180 in the vicinity of the package 184. The package 184 may be equipped with a reader electronic to obtain the information of the RFID tag. A central unit 191 can have a memory that stores the physical properties of the transport load and can accordingly configure the calculations to take the interference expected from the specific transport load into account when making distance calculations. In other embodiments the package 184 is equipped with sufficient sensing and measurement equipment to take a measurement of the inductance profile (or any other necessary measurements) of the transport load 180 such that the expected interference can be calculated from the measurements taken by the package 184 upon attaching the package 184 to the transport load 180.

In some embodiments there are multiple packages, with one or more of the packages having more electronics and communication capabilities than the other. One package can be a master package that contains more equipment and performs more tasks such as calculations and communication with a central calculation component and the other package(s) is(are) slaves that have fewer capabilities. For example the slave packages may have only an antenna and the ability to create the magnetic field, but can only communicate with the master.

The system can include a central processing unit 191 which can communicate with the antennas to coordinate the movements and make calculations necessary to determine distances and to identify a movement direction that will move the lifted load closer to the desired position. The processing unit 191 can be located on a truck near the job site or it can be remotely located and operated. The processing unit 191 can communicate with the package 184 via the antenna 198. The processing unit 191 can include data storage means such as a database or hard drive which can store information relating to the electromagnetic properties of the transport loads and can use the information specific to each load to calculate the inductance profile from which the distances are calculated. The processing unit 191 may display the results of the location of the lifted load versus the landing load on a screen so that the operators involved with the process of moving the lifted load are continuously informed. In particular, such crane may be installed near the crane operator (or even in the control cabin of the crane).

Figure 13:
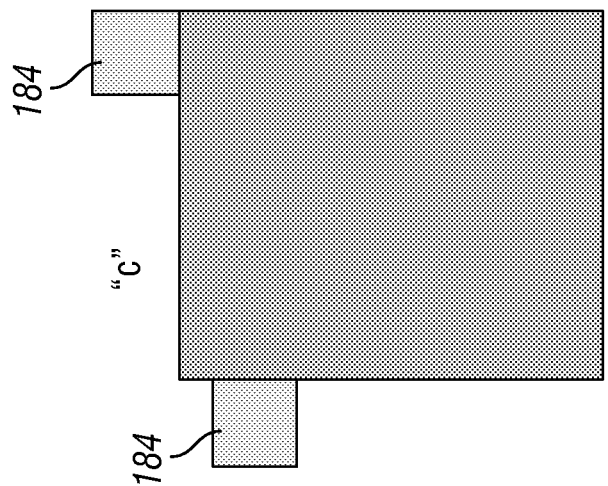
FIG. 13 is an illustration of embodiments of the present disclosure in which antenna packages are coupled to a transport load.
Figure 13:
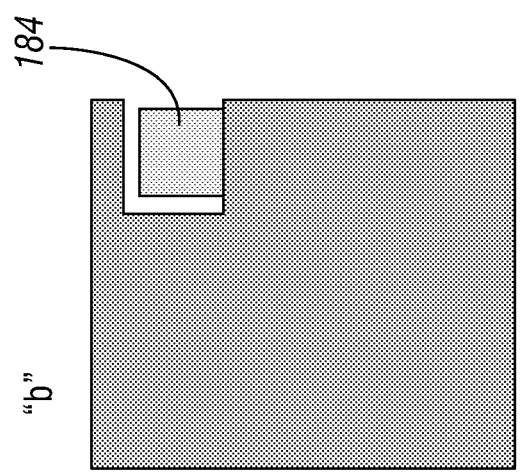
Figure 13:
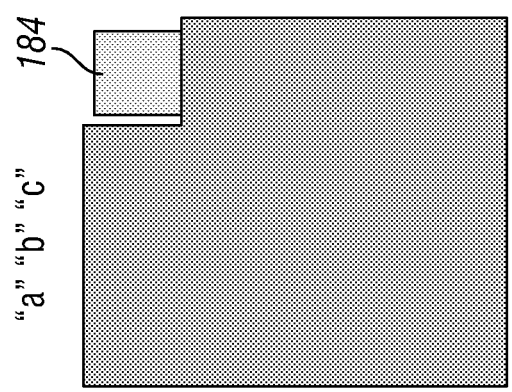

FIG. 13 is an illustration of embodiments of the present disclosure in which antenna packages 184 are coupled to a transport load 180. FIG. 13 shows three configurations: a, b, and c. In configuration a the transport load 180 has a recess in which the antenna package 184 is placed. The size and position of the recess is chosen such that the antenna package 184 fits within an envelope of the transport load 180. Accordingly the antenna package 184 will not interfere with the stacking of the containers. Configuration b shows a recess in a sidewall of the transport load 180, and configuration c shows antenna packages 184 which are not within a recess but rather are placed on top of and on the side of the transport load 180. With the usage of the antenna package 184 easily installed on the transport load 180, a limited number of antenna package 184 is required. These required number of antenna package are located on the proper transport lad before starting the process of handling one load (lifted load) on the other transport load (landing target). When the stacking is completed, the antenna package may be moved onto the next transport load for the next stacking process.

Figure 14:
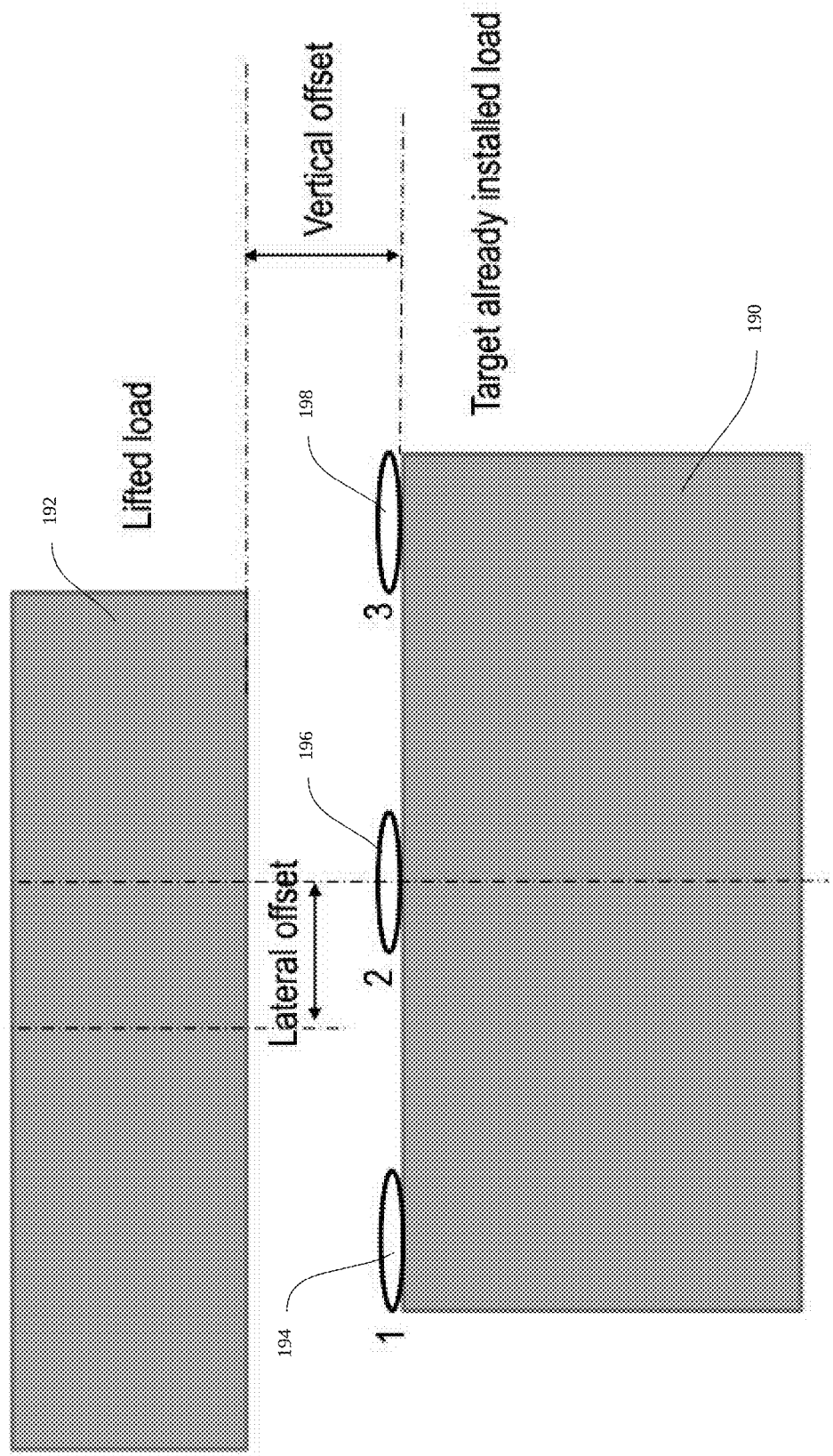
FIG. 14 is a schematic front view of two stackable containers according to embodiments of the present disclosure.

FIG. 14 is a schematic front view of two stackable containers 190 and 192 according to embodiments of the present disclosure. It is to be understood that the containers can be any stackable object of virtually any size or shape. In many applications containers have a rectangular shape for ease of stacking; however, the systems and methods of the present disclosure are applicable to objects of any imaginable shape and size without limitation. The stacked container 190 has been placed and will be the supporting surface for the lifted container 192 which is lifted by a crane or another suitable moving apparatus. In some embodiments the stacked container 190 has a plurality of antennas installed on a top surface. In the embodiment shown there are three antennas: a left antenna 194, a middle antenna 196, and a right antenna 198. There may be more antennas than these three and the terms "right" "left" and "middle" may be determined by the perspective of the viewer and are not limiting terms. The lifted container 192 is currently above the stacked container 190 by a certain distance shown as the vertical offset, and displaced laterally by the lateral offset. In some embodiments the antennas detect the presence of the lifted container 192 each differently because of the offset. As the lifted container 192 is first moved from the left side the left antenna 194 will be the first to detect the presence of the lifted container 192. Next is the middle antenna 196 which will have a similar detection profile as the lifted container 192 moves over it. The third antenna 198 will also detect the lifted container 192. The signal from the left antenna 194 will begin to change as the left edge of the lifted container 192 passes the left end of the stacked container 190. The containers may be the same size in the lateral dimension, or the antennas can be placed at locations equal to the desired position of the lifted load 192.

Figure 15:
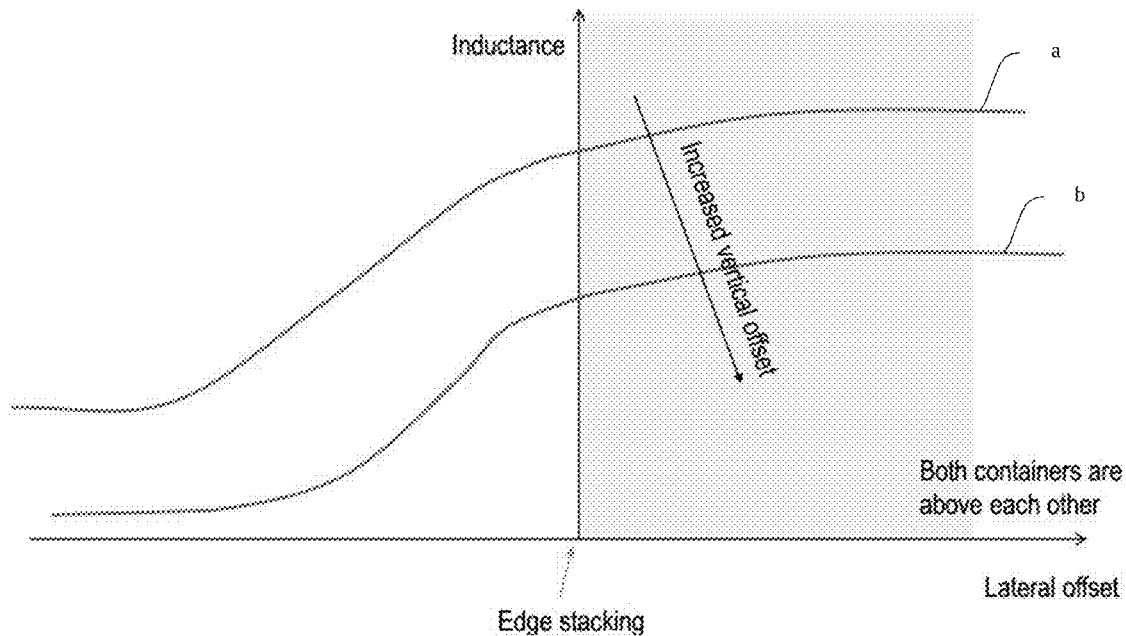
FIG. 15 shows a graph of inductance against lateral offset according to embodiments of the present disclosure.

FIG. 15 shows a graph of inductance against lateral offset according to embodiments of the present disclosure. With increased vertical offset the inductance is less. Plot A is a vertical first vertical offset and plot B is a second vertical offset greater than the first vertical offset. Knowing the electrical properties of the containers will allow the calculation of vertical offset. The midpoint shown on these plots indicates the time at which the edges pass over the antennas.

Figure 16:
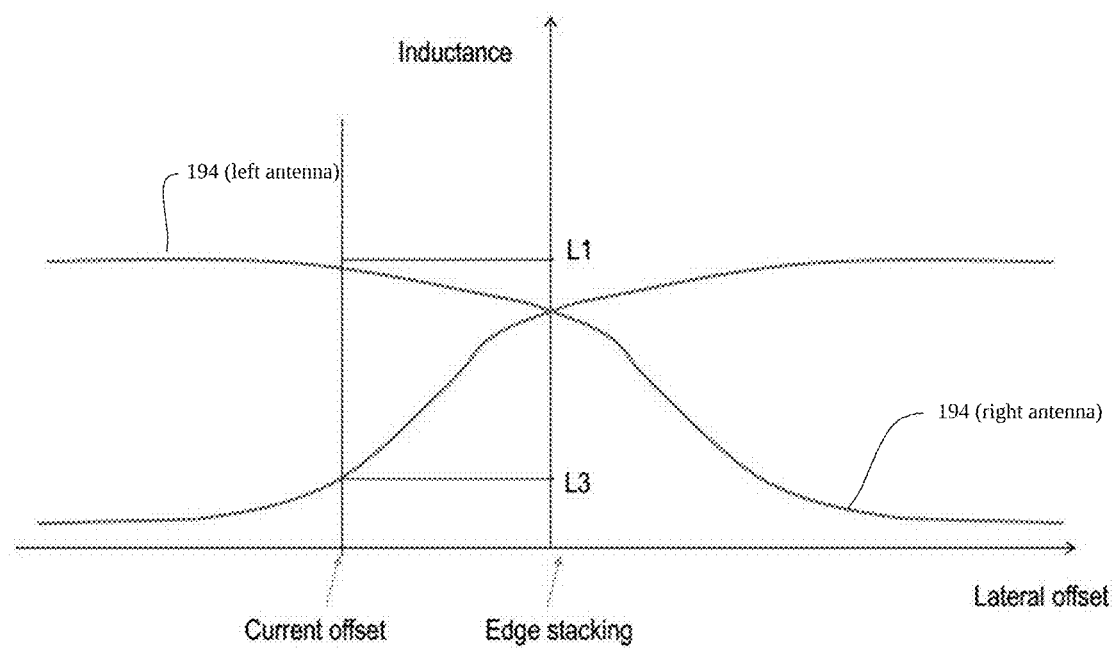
FIG. 16 shows a plot of two inductances pertaining to the left and right antennas, respectively, from FIG. 14 according to embodiments of the present disclosure.

FIG. 16 shows a plot of two inductances pertaining to the left and right antennas 194 and 198, respectively, from FIG. 14 according to embodiments of the present disclosure. At the "current offset" time, which pertains to the position shown in FIG. 14, the inductance of the left antenna 194 is steady at a relatively high value and the inductance of the right antenna 198 is steady and relatively low. As the lifted container 192 is moved to the right the inductance of each moves toward a convergence shown at the "edge stacking" position. When the lifted container 192 is directly over the antenna equally, the inductance effect will be the same for each antenna indicating that the container is in the correct lateral position. The load can then be lowered into place.

Figure 17A:
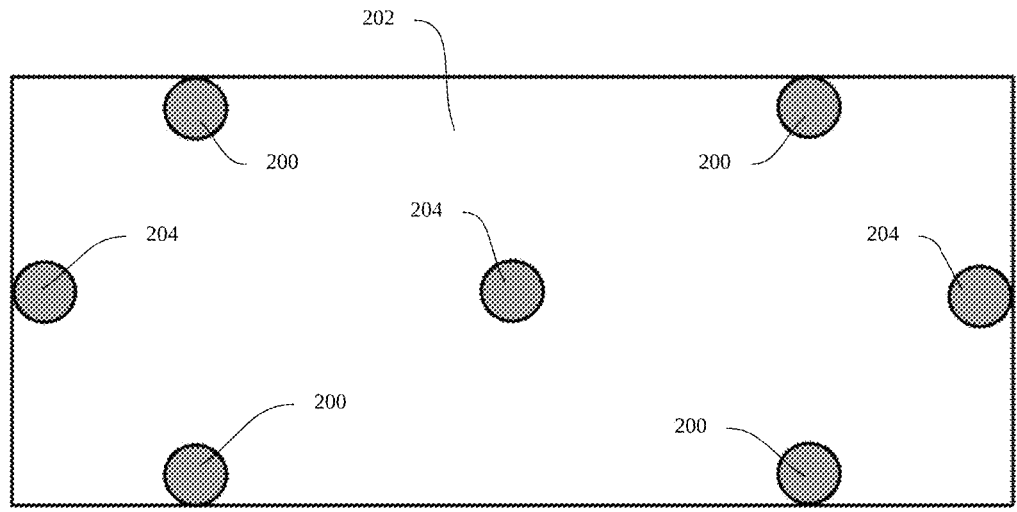
FIGS. 17A and 17B are illustrations of possible positions for antennas on a top side of a stacked container according to embodiments of the present disclosure.
Figure 17B:
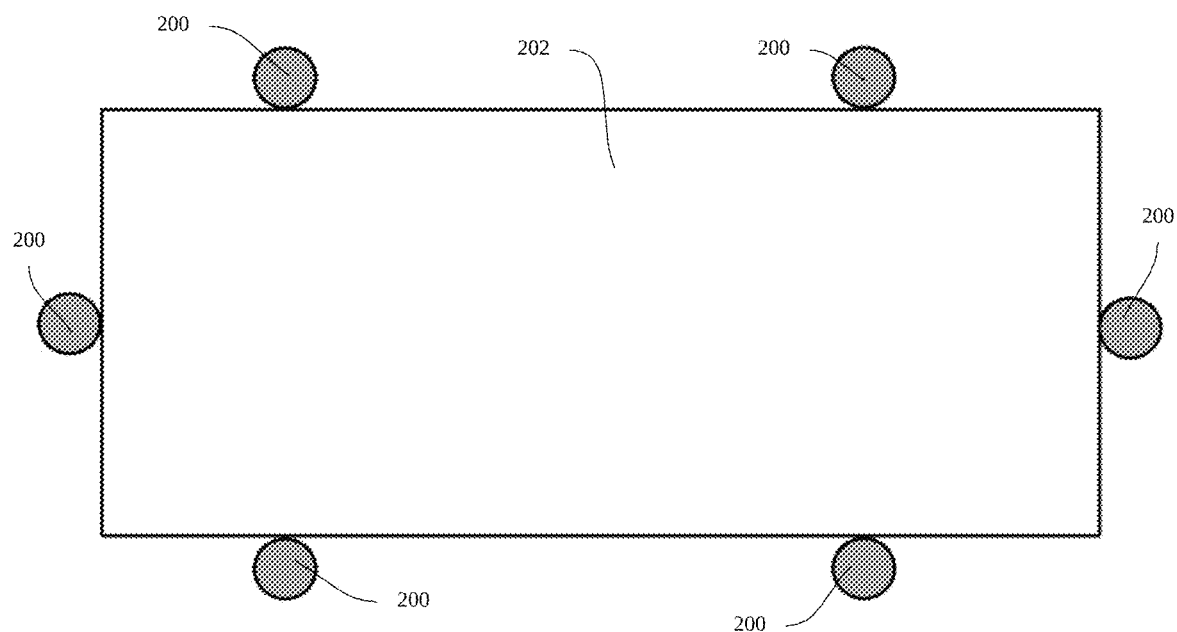

FIGS. 17A and 17B are illustrations of possible positions for antennas 200 on a top side of a stacked container 202 according to embodiments of the present disclosure. With six antennas, six variables can be solved for; however, in some applications fewer than six are desired because certain variables are assumed or can be acquired from other sensing means such as by using a level or a crane with load-balancing capabilities. In some embodiments the middle "row" of antennas 204 can be different than the antennas at the edges. The antennas 204 can be higher frequency and therefore lower distance sensors configured to perform the edge stacking routine as described above, and the edge antenna 200 can be lower frequency, higher distance antennas used more for the initial stage where the load to be stacked is brought toward the stacked container 202 from a greater distance. The configuration shown in FIG. 17B may allow to access the antenna after the completion of the stacking process so that they can be removed and installed on another container for the execution of the next stacking operation.

Figure 18:
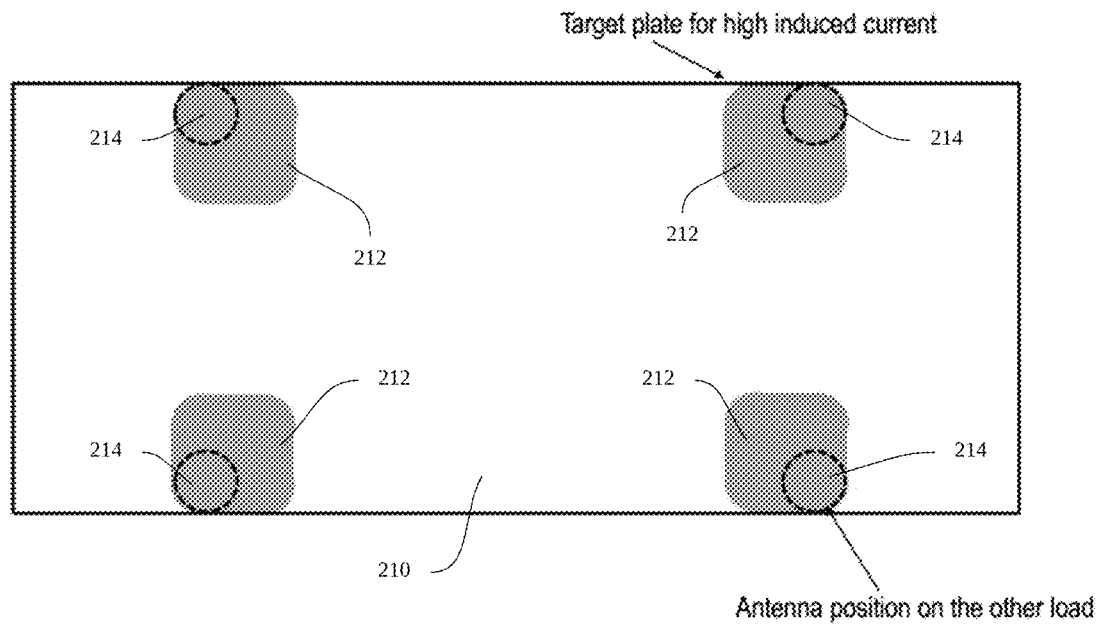
FIG. 18 is a schematic illustration of a metal target configuration according to embodiments of the present disclosure.

FIG. 18 is a schematic illustration of a metal target configuration 210 according to embodiments of the present disclosure. A metal target 212 can be placed at a location upon which a lifted load (not shown) is to be placed. The metal target 212 can have a specific inductance characteristic to allow easy identification of the metal targets. Such metal target may be permanently attached to the lifted load. Welding or other suitable attachment mechanism could be used for attachment.

Antenna 214 can be placed on the landing load in a configuration matching the placement of the metal targets 212. The metal targets 212 can be larger than the antenna 214 such that placement of the antenna 214 at an outer periphery of the metal targets as shown is detectable and allows for highly accurate placement of the lifted load. In other embodiments one, two, or three metal targets and antennas can be used to achieve similar accuracy. The antennas 214 can be positioned at the interior periphery of the metal targets or at any other suitable location. The inductance disruption caused by the metal targets 212 can be known ahead of time and the lifted load can be placed accurately by controlling movement of the lifted load to match the expected values when the lifted load is in the correct position.

Figure 19:
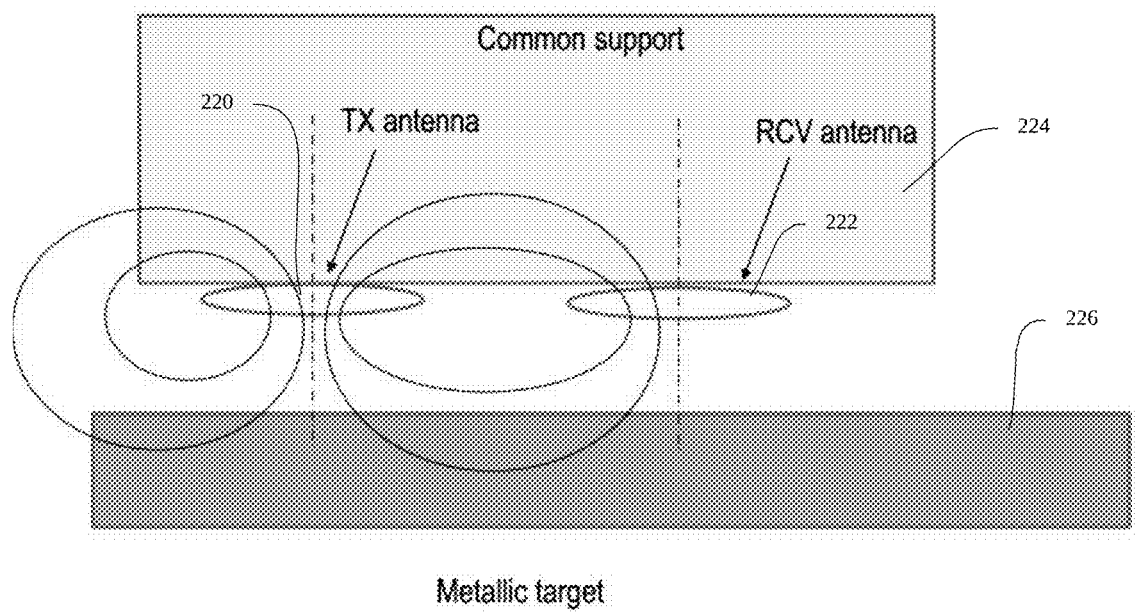
FIG. 19 is yet another embodiment of the present disclosure in which a transmission antenna and a receiving antenna are separated by a certain distance according to embodiments of the present disclosure.

FIG. 19 is yet another embodiment of the present disclosure in which a transmission antenna 220 and a receiving antenna 222 are installed on one common support 224 and separated by a certain distance according to embodiments of the present disclosure. A metallic target 226 can be a container or a metal target or any other object having the necessary electromagnetic properties. The support 224 can be another container or another object. The transmission antenna 220 is separated from the receiving antenna 222 by a known distance. The received signal of the receiving antenna 222 is affected by the presence and distance of the metallic target 226: typically, the antenna coupling increased when the metallic target is larger and closer of the set of antennas. This effect allows to determine the distance between the antenna common support 224 and the metallic target 226. It can be understood that the metallic target 226 may be the lifted load, while the common support may be the "landing container."

Figure 20:
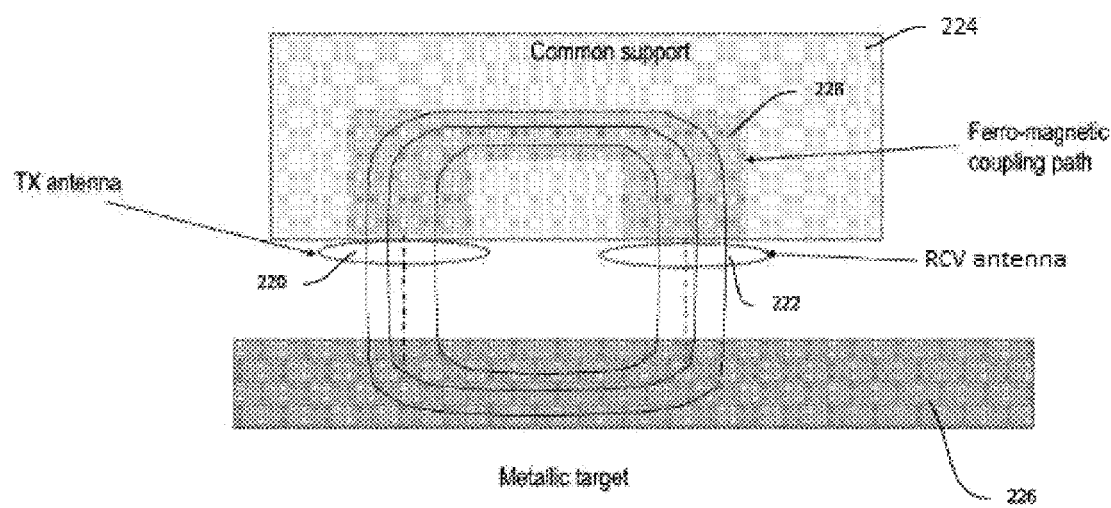
FIG. 20 is another illustration of a transmitter and receiver according to embodiments of the present disclosure.

FIG. 20 is another illustration of a transmitter 220 and receiver 222 according to embodiments of the present disclosure. The support 224 can include a ferro-magnetic coupling path 228 to guide the AC magnetic flux from the transmitting antenna to the receiving antenna that enhances the effect of the magnetic field and provides for more ready measurements and/or requiring less power to achieve the same degree of accuracy. In some embodiments the support 224 can have separated transmission and receiving antennas as shown, or it can have a single, non-separated antenna.

Figure 21:
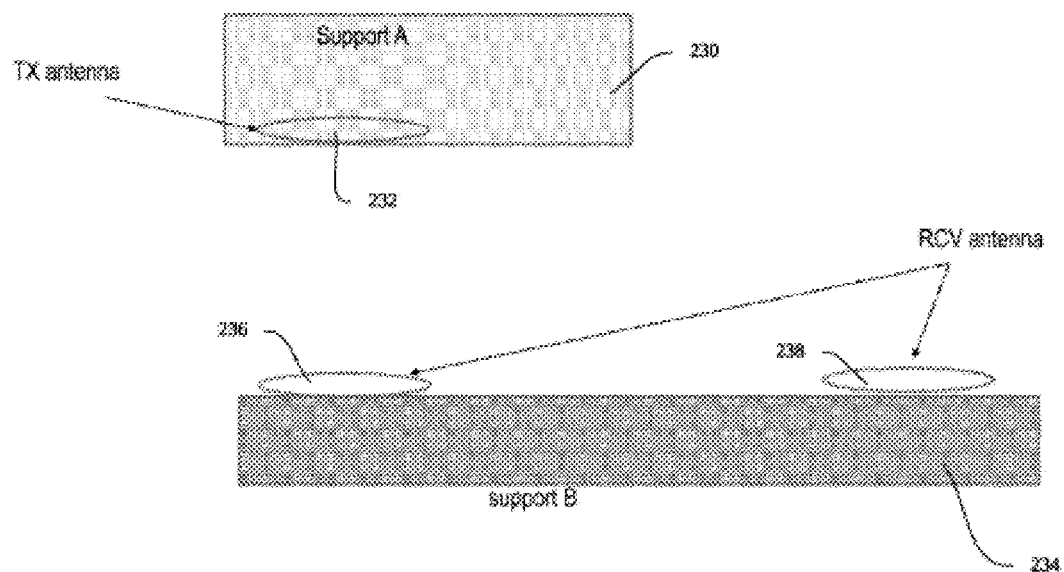
FIG. 21 shows a further embodiment in which a first support has a transmission antenna and a second support has separated receiving antennas.

FIG. 21 shows a further embodiment in which a first support 230 has a transmission antenna 232 and a second support 234 has separated receiving antennas 236 and 238. In some embodiments the transmission antenna 232 can have two separate antennas and the receiving antenna is a single antenna. The spacing between the separate transmitting antenna or receiving antenna can be determined from the signal at the receiving antennas.

Figure 22:
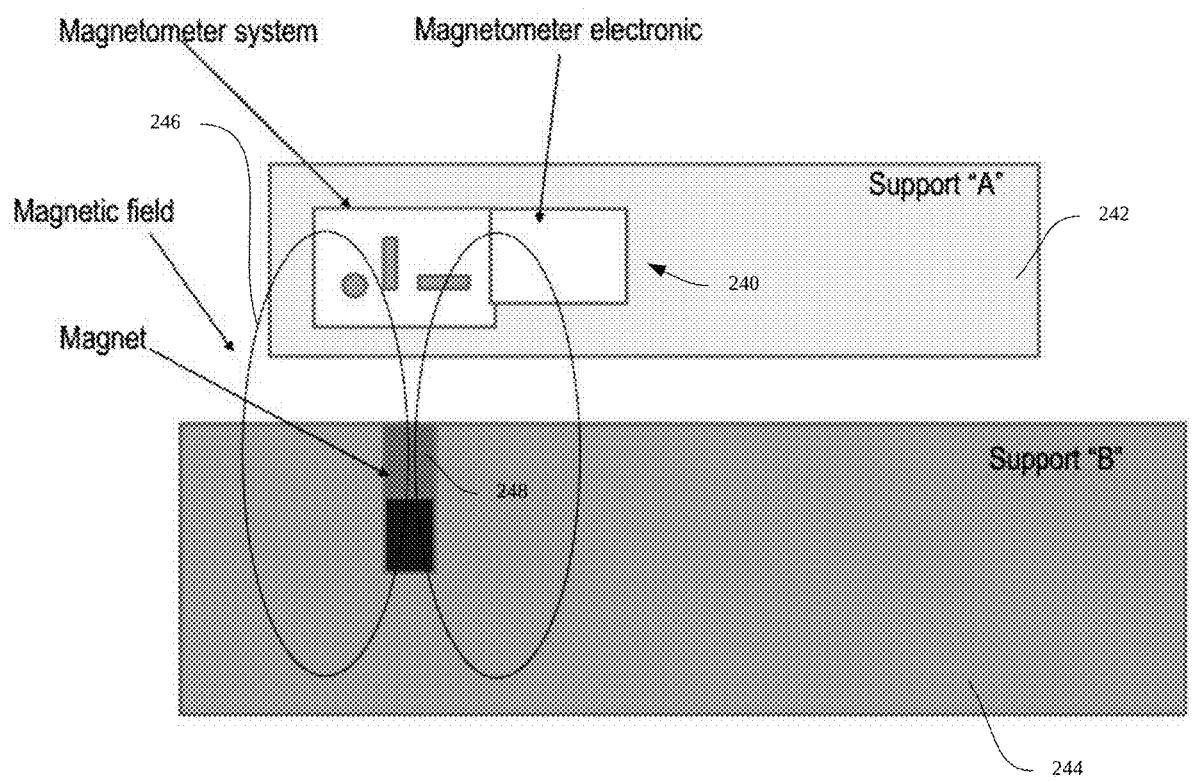
FIG. 22 is a schematic illustration of a configuration including a magnetometer according to embodiments of the present disclosure.

FIG. 22 is a schematic illustration of a configuration including a magnetometer 240 according to embodiments of the present disclosure. A first support 242 and second support 244 can be configured to carry components to measure distance between them using inductance. The first support 242 includes a magnetometer 240 which drives a magnetic field 246 which responds to a magnet 248 carried by the second support 244. The variations in the magnetic field are measured and interpreted into distance which can be used to stack containers or precisely move any other suitable object.

Figure 23:
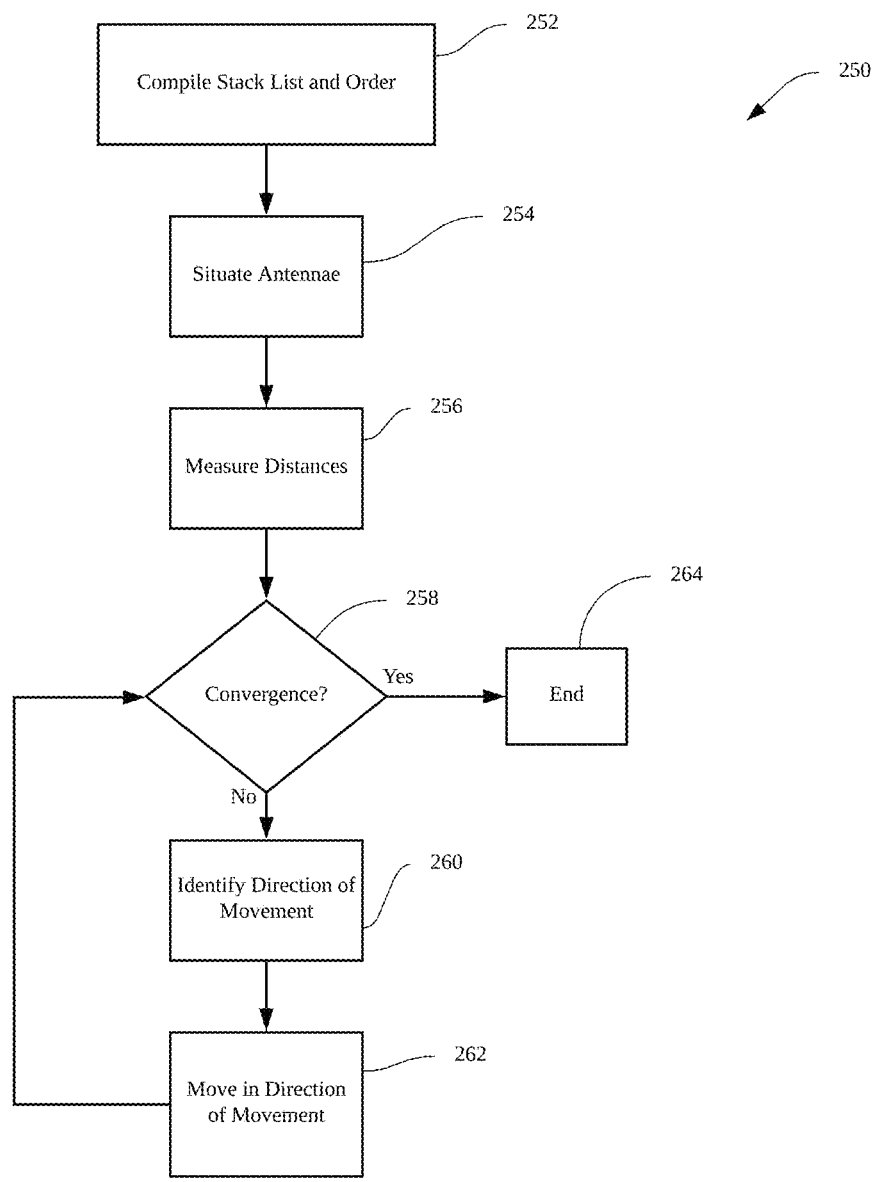
FIG. 23 is a block diagram showing a method for placing an object according to embodiments of the present disclosure.

FIG. 23 is a block diagram showing a method 250 for placing an object according to embodiments of the present disclosure. At 252 the method includes compiling a stack list and order. The stack list can include a list of containers or other objects that are to be placed in a desired physical and spatial relationship to one another. The objects can be containers with contents that need to work together such as for a drilling rig operation. Some of the objects are to be stacked on top of one another, and some are to be placed in other relationships which may or may not include physical contact. The list can include electromagnetic properties of each object in the list, which may include the contents of a container. These properties can be calculated ahead of time, modeled using theory, or measured ahead of time or at the job site.

At 254 antennas are situated. This can include situating both transmission and receiving antennas, or using a single antenna. The antenna can be placed on the ground or on another object upon which the first container is to be placed, or it can be placed on the first container. The antenna can be a prepackaged antenna as shown in greater detail in FIG. 12.

At 256 the method includes measuring distances between the lifted load and the desired location. The electromagnetic properties of the lifted load are used to calculate the disturbance in inductance caused by the lifted load as discussed elsewhere herein. At 258 a test for convergence is performed. If convergence is not yet achieved the method continues at 260 by identifying a direction of movement using the different antennas. At 262 a movement is executed in the direction identified. The method then checks for convergence again. This repeats as many times as necessary to achieve satisfactory convergence. The checks can be frequent (i.e. on the order of milliseconds) or relatively infrequent (i.e. on the order of seconds or minutes). Convergence criteria can be as strict or lenient as required. Some stacking and building operations will require accuracy to within less than a centimeter while others are more forgiving. At 264 the method terminates.

Figure 24:
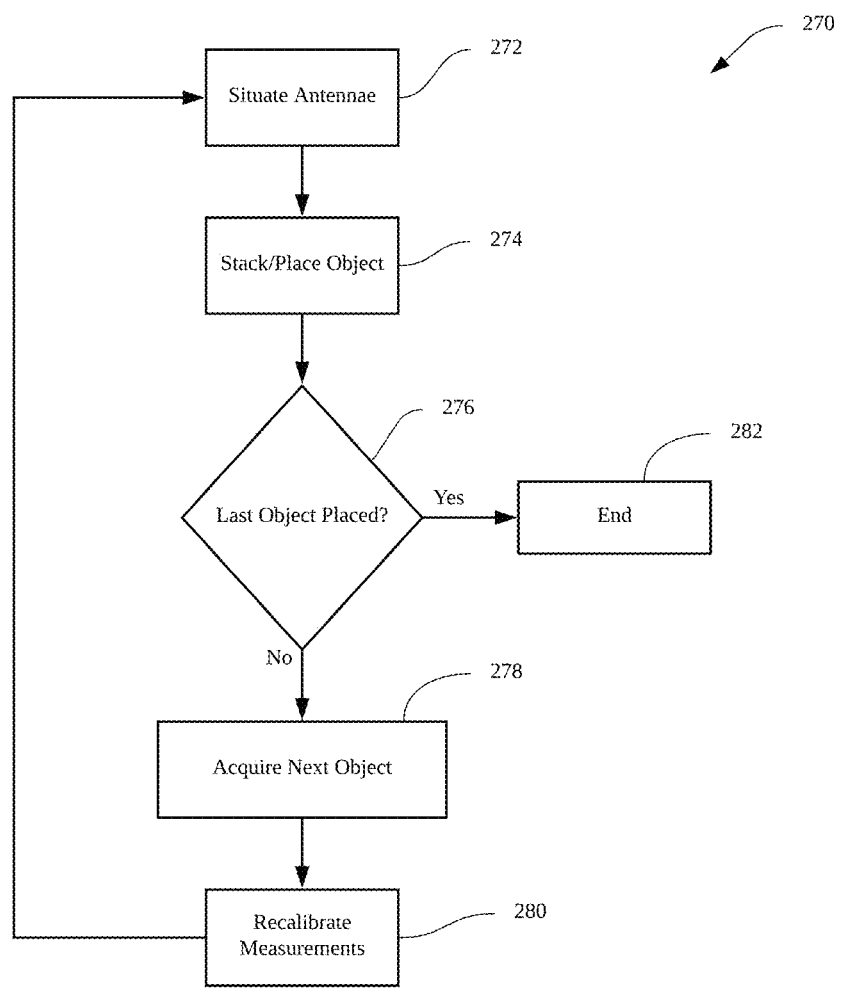
FIG. 24 is a block diagram of a method of an embodiment.

FIG. 24 is another block diagram showing a method 270 for stacking a series of objects according to embodiments of the present disclosure. At 272 the method includes situating antennas. This can be achieved by placing a packaged antenna onto an object such as by hanging on hooks or by other suitable fastening means. At 274 the method includes stacking/placing the object by features of the methods shown in FIG. 24 and described elsewhere herein. At 276 a check is performed for if the object just stacked/placed was the final object in the list. If not, the method continues at 278 by acquiring the next object in the list and at 280 by recalibrating the measurements. Recalibrating measurements can include accessing a database or memory to acquire the electromagnetic properties of the object to be stacked. In some embodiments it includes measuring the electromagnetic properties of the object and using them in the calibration. The method then repeats by situating the antenna at 272 and so forth.

According to the embodiments shown and described herein a series of objects can be stacked and positioned relative to one another and to other features such as the ground or a railing system or another component of a drilling rig. The systems and methods of the present disclosure reduce or eliminate the need for a human operator to be in harm's way and out of the sight of a crane operator. The possibility for human error is drastically reduced. In some embodiments the containers can have a mechanically-interlocking feature such as a cone and groove that can help with the final stages of stacking, and the systems and methods of the present disclosure help to arrive at a position from which the mechanically-interlocking feature can finish the job.

The foregoing disclosure hereby enables a person of ordinary skill in the art to make and use the disclosed systems without undue experimentation. Certain examples are given to for purposes of explanation and are not given in a limiting manner.

The invention claimed is:

1. A system for placing a series of objects, comprising:
 a data storage component configured to store electromagnetic properties pertaining to a series of objects and to store a list of the objects in a predefined order, wherein the objects are to be positioned relative to one another serially;
 a moving device configured to move a first object in the series relative to a second object in the series;
 a plurality of rangefinders coupled to the first object and being configured to measure distance to the second object, wherein individual rangefinders comprise:
  an AC current source;
  an antenna configured connected to the AC current source to generate an AC magnetic field around the antenna; and
  a measurement component configured to measure the AC magnetic field and disruptions in the AC magnetic field caused by the second object; and
 a processing unit configured to:
  communicate with one or more of the rangefinders;
  access the electromagnetic properties of the second object from the data storage component, wherein the disruptions in the magnetic field caused by the second object are a function of the electromagnetic properties of the second object;
  receive two or more variables pertaining to position of the first object relative to the second object, wherein a number of variables is equal to a number of rangefinders; and
  process the variables to resolve at least one of the positions or orientations of the first object in relation to the second object.

2. The system of claim 1 wherein the processing unit is further configured to identify a direction of movement for the moving device to move the first object until the first object is in a desired position relative to the second object.

3. The system of claim 1 wherein the first object is stationary and the moving device is configured to move the second object.

4. The system of claim 1 wherein the plurality of rangefinders comprises a master rangefinder configured to communicate with the processing unit and slave rangefinders configured to communicate with the master rangefinder.

5. The system of claim 1 wherein the plurality of rangefinders are packaged in a self-contained unit that is configured to be attached to the first object.

6. The system of claim 5 wherein the self-contained unit comprises two or more antennas, wherein each antenna is configured to operate as a rangefinder and provide variables related to distance and position of the second object.

7. The system of claim 5 wherein the self-contained unit comprises three antennas, one on a front side, one on a top side, and one on a side, wherein each antenna is configured to operate as a rangefinder and provide a distance measurement.

8. The system of claim 7 wherein two such self-contained units are used in conjunction to provide six antennas, wherein each antenna is configured to operate as a rangefinder and provide a distance measurement, and further wherein the top antennas are facing the same direction, the front antennas are facing the same direction, and the side antennas are facing in opposite directions.

9. The system of claim 5 wherein the self-contained unit is removably hooked onto the first object.

10. The system of claim 1 wherein there are six rangefinders and six variables, pertaining to an x position, an x angle, a y position, a y angle, a z position, and a z angle.

11. The system of claim 1 wherein two rangefinders are configured to be spaced apart from one another by a width of the second object, and wherein the processing unit is configured to identify that the first object has reached a desired position relative to the second object when a disruption in the magnetic field caused by the second object is substantially the same at both rangefinders.

12. The system of claim 1 wherein the objects comprise stackable storage containers and wherein the electromagnetic properties include the electromagnetic properties of the container and its contents.

13. The system of claim 1 wherein the second object has induction targets mounted thereto, wherein the induction targets are configured to disrupt the magnetic field, and wherein an extent to which the induction targets disrupt the magnetic field is stored in the data storage component.

14. The system of claim 13 wherein the second object has two induction targets on a front side, two induction targets on a top side, one induction target on a first side and one induction target on a second side opposite the first side.

15. The system of claim 1 wherein the measurement component is further configured to measure the AC magnetic field and disruptions in the AC magnetic field caused by the second object, wherein the plurality of rangefinders comprises a first rangefinder and a second rangefinder, wherein the disruptions are caused by the second rangefinder, and wherein at least one of the first and second rangefinders is configured to receive a surrounding disrupted AC magnetic field.

16. The system of claim 1 wherein the antenna comprises a magnet and magnetometer.

17. A method, comprising:
compiling a list of objects to be placed relative to one another serially;
acquiring electromagnetic properties of the objects;
for each consecutive pair of objects, first and second:
positioning rangefinders on the first object;
propagating a AC magnetic field from the rangefinders, wherein the magnetic field is disrupted by the second object in a manner that is known from the electromagnetic properties;
determining an acceptable relation of distance and angle between the first and second object from the magnetic field disruption, wherein a predetermined number of variables pertaining to the physical position of the first object are calculated from the predetermined number of rangefinders, wherein the predetermined number of variables is the same as the predetermined number of rangefinders; and
determining at least one of a position and an orientation of the second object versus the first object by solving simultaneously the variables pertaining to the physical position of the first object.

18. The method of claim 17, further comprising identifying a direction of movement that will bring the first object nearer to a desired position relative to the second object, and moving the first object in the direction of movement.

19. The method of claim 17, further comprising repeating determining the distance between the first and second object and identifying a direction of movement until the first object is within a predefined tolerance from the second object.

20. The method of claim 17 wherein compiling the list of objects comprises taking measurements of the objects.

21. The method of claim 17 wherein positioning rangefinders on the first object comprises removably coupling a package to the first object, wherein the package contains communication means and one or more antenna configured to provide a distance measurement.

22. A system, comprising:
a packaged rangefinder unit removably coupled to an object, the rangefinder unit comprising:
a battery;
a plurality of antennas;
a signal generator configured to emit an electromagnetic signal from the antennas using the battery, wherein each antenna is configured to take a reading of a disturbance in the electromagnetic signal caused by an induction target;
a plurality of analog electronic components corresponding to the plurality of antennas configured to amplify and filter a signal at the antennas;
a digital unit configured to calculate a distance from electromagnetic properties of the induction target and the reading of the disturbance; and
a communications unit; and
a processing unit configured to communicate with the communications unit of the rangefinder unit, wherein the processing unit is further configured to:
obtain an electromagnetic property of the induction target from a data storage, wherein the disturbance in the electromagnetic signal is a function of the electromagnetic property of the induction target;
receive, from the rangefinder unit, a value for a variable representing a position of the rangefinder unit relative to the induction target; and
determine at least one of a position or an orientation of the induction target in relation to the object based on the value for the variable.

23. The system of claim 22, wherein the packaged rangefinder unit has three orthogonal sides each having one of the plurality of antennas.

24. The system of claim 22, wherein the packaged rangefinder unit further comprises an RFID tag or an RFID reader configured to allow communication between the packaged rangefinder unit and the object.

25. The system of claim 22, further comprising a plurality of packaged rangefinder units, including the rangefinder unit, each coupled to the object, wherein:
the processor is configured to communicate with a communication unit of each of the plurality of packaged rangefinder units, so as to receive values for a plurality of variables, including the value for the variable, representing positions of the respective rangefinder units relative to the induction target, wherein a number of the variables is equal to a number of the plurality of rangefinder units;

the data storage component is configured to store electromagnetic properties of a series of objects, including the object and the induction target, and to store a list of the objects in a predefined order, wherein the objects are to be positioned relative to one another serially; and the processor is further configured to determine the at least one of the position or orientation of the induction target in relation to the object based on the values for the plurality of variables.

\* \* \* \* \*